US008055743B2

(12) United States Patent
Frutiger et al.

(10) Patent No.: US 8,055,743 B2
(45) Date of Patent: Nov. 8, 2011

(54) SYSTEM AND METHOD FOR CONFIGURING A NETWORK AFTER REPLACING A NODE

(75) Inventors: Theo Frutiger, Buffalo Grove, IL (US); James J. Coogan, Des Plaines, IL (US); Alex Cherny, Buffalo Grove, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 1451 days.

(21) Appl. No.: 11/039,079

(22) Filed: Jan. 19, 2005

(65) Prior Publication Data

US 2006/0159007 A1   Jul. 20, 2006

(51) Int. Cl.
*G06F 15/173* (2006.01)
(52) U.S. Cl. ......... 709/223; 709/221; 709/222; 709/227
(58) Field of Classification Search .................. 709/223, 709/221, 222, 227
See application file for complete search history.

(56) References Cited

U.S. PATENT DOCUMENTS

| | | | |
|---|---|---|---|
| 6,353,861 B1 * | 3/2002 | Dolin et al. | 719/318 |
| 7,085,814 B1 * | 8/2006 | Gandhi et al. | 709/208 |
| 7,395,359 B2 * | 7/2008 | Reister | 710/8 |
| 2002/0152298 A1 * | 10/2002 | Kikta et al. | 709/223 |
| 2002/0161596 A1 * | 10/2002 | Johnson et al. | 705/1 |
| 2006/0031435 A1 * | 2/2006 | Tindal | 709/220 |

\* cited by examiner

*Primary Examiner* — Jeffrey Pwu
*Assistant Examiner* — Abdelnabi Musa

(57) ABSTRACT

A tool is provided for use when replacing devices in an automatically controlled distributed processing system. In one embodiment a network management tool reestablishes all or a portion of the logical connections formerly provided to a bound node where a replacement device is or will be located. The network management tool compares data associated with the logical connections of the bound node and data associated with the logical connections for the replacement device to determine proper logical connection. The network management tool identifies network variables associated with the bound node that are not associated with the replacement device and deletes those network variables from other devices on the network if the network variable is not useful in the network after the replacement device is bound.

21 Claims, 14 Drawing Sheets

SYSTEM AND METHOD FOR CONFIGURING A NETWORK AFTER REPLACING A NODE

This application claims the benefit of and/or priority to U.S. application Ser. No. 10/839,750 filed May 5, 2004, which in turn claims the benefit of and/or priority to U.S. provisional application Ser. No. 60/492,641 filed Aug. 5, 2003.

FIELD OF THE INVENTION

The present invention relates to distributed processing in automation control systems, and in particular, to automation control systems that use network variables and configuration properties to facilitate distributed processing.

BACKGROUND OF THE INVENTION

Automation control systems are well-known. Such systems include building automation systems for controlling environmental equipment, fire and safety equipment, security equipment, elevator banks, and the like. Other automation control systems include industrial control, food processing, and transportation systems. In general, these systems receive data from sensors that are evaluated to determine control actions to take in order to bring about some condition or perform some operation. For example, an environmental control system uses sensors to detect environmental conditions and system parameters throughout a building or other space to determine control actions that are necessary to bring the regulated space to some defined condition.

In modern systems, the advent of relatively inexpensive processors has allowed manufacturers to incorporate processors into many of the various components within such systems. Accordingly, each of the devices in the system may be a "smart" device. Such a device is capable of doing at least some level of data manipulation. Additionally, the devices may be equipped with a transmitter allowing the device to provide data to the network. The device may further include a receiver to receive data from the network. Accordingly, even sensors may be smart devices, transmitting data to the network.

There exist a wide variety of sensors for a wide variety of purposes. Sensors can include temperature sensors, infrared body detectors, position indicators, water flow meters, air flow meters, water pressure meters, air pressure meters, and the like. Position indicators, for example, are devices that generate a signal that corresponds to the position of a switch, valve, or vent opening so the system controller may determine whether particular lights, fans, vents, or blower motors are operating or open. The data that is generated by the sensors is provided to one or more controllers in the control system. The data may be provided directly to the controller, or by transmission through the network.

The controllers in many cases compare the data to desired values for the particular sensed condition. The desired values are called set points. The controllers perform control actions to bring the sensed parameters into compliance with the conditions corresponding to the set points. In some cases, sensors that sense one condition may be used to effect control of another condition. For example, a sensor data that indicates a person's entry into a room may be used to initiate control actions to achieve lighting, ventilation, and thermal comfort conditions specified for an occupied space. Such control actions may include the activation of blower motors to bring conditioned air into the room through vents that are also opened in response to control signals generated by the controller.

Additional control actions may involve obtaining temperature sensor data and controlling the various devices to maintain the desired temperature. In this manner, the controller may regulate the environmental conditions in a space.

The use of smart devices in a system allows for the control of the system to be de-centralized or distributed. Distributed processing may be used in an environmental control system to coordinate control of the system with the various heating, ventilation and air conditioning (HVAC) functions in the system. For example, an air-handling unit (AHU) in an HVAC system distributes conditioned air to several variable air volume (VAV) terminals in a building. Thus, VAV controllers exchange data with the AHU controller so the AHU appropriately provides conditioned air to the VAVs and the AHU controller may synchronize the operation of these local space controllers.

Different companies, however, frequently manufacture the various devices within a control system. Accordingly, it is possible that a device manufactured by a first company would have a communication protocol different from the protocol used by a device manufactured by a second company. When devices of a system employ different protocols, the consumer must absorb the expense of creating an interface system for the various devices. Alternatively, the consumer may limit the system to devices from a limited number of manufactures, all of whom employ the same protocol.

In response to this problem, various "standard" communications protocols have evolved which are used by a number of different manufacturers. A benefit of such protocols is to allow for interoperability between devices produced by the various manufactures. In an interoperable environment, by ensuring that a replacement device uses the same protocol as the rest of the network, a consumer can purchase a device with the assurance that the device will be able to communicate with the rest of the consumer's system once installed. One such protocol is the LONTALK protocol, also known as the ANSI/EIA 709-1 Control Networking Standard.

The LONTALK protocol is a layered, packet based, peer-to-peer communications protocol designed specifically for control systems. Typically, standardized deployment of the protocol is achieved by the use of a NEURON Chip, commercially available from Toshiba America Electronic Components, Inc., of Irvine Calif. and Cypress Semiconductor Corporation, of San Jose, Calif. The NEURON Chip is programmed with all levels of the communications protocol with the exception of the application level. Accordingly, to allow for interoperability, a manufacturer may incorporate a NEURON Chip in a device.

Of course, use of a NEURON Chip does not mean that a device is interoperable with other devices incorporating NEURON Chips. This is because the application level of the device is programmed by the individual manufacturer in accordance with the manufacturer specific design of the device. To ensure interoperability, the inputs and outputs of the device at the application level must also be standardized. This is accomplished in a LONTALK protocol device by the use of standardized functional profiles. Standardized functional profiles are discussed more fully below. In essence, however, the standardized functional profiles establish common data formats that are used for passing data at the application level.

Accordingly, by using devices with a shared protocol that fit standardized functional profiles, a consumer ensures that a new device, regardless of its manufacturer, will be capable of sending messages to and receiving messages from other devices already in the network. To this end, the protocol ideally enables communication without prior detailed knowledge of the topology of the network. In other words, a single device may be used within networks having diverse topologies. Obviously, the individual installing the device must be aware of the network topology so as to allow for necessary bandwidth and interconnections. However, assuming that the installer has properly accounted for the topology prior to installing a device, the device will be able to communicate with other devices in the network. This capability is enabled by maintaining control functions within the various devices while passing data between the devices in the system using the protocol. Such a system may be referred to as an information-based control system.

A network based upon the LONTALK protocol allows remote network management tools to interact with components over the network, including reconfiguration of network addresses and parameters, downloading of application programs, reporting of network problems, and start/stop/reset of component application programs. Beneficially, the network may be implemented over basically any medium, including power lines, twisted pair, radio frequency (RF), infrared (IR), coaxial cable and fiber optic or combinations thereof.

Communications protocols such as LONTALK provide significant advantages in implementation of a distributed processing system. However, there are some difficulties associated with such protocols. One such problem arises when devices are replaced with either devices from a different manufacturer or even updated devices from the same manufacturer. Devices that are configured in accordance with the LONTALK protocol are referred to as LONWORKS devices. However, a replacement LONWORKS device is typically not configured to interface with a system in the same manner as the LONWORKS device being replaced. For example, a single device may be useful in a number of configurations, each configuration using and creating a different set of input and output data.

The primary means of accessing data within a LONWORKS device is via Network Variables (NVs) and Configuration Properties (CPs). The NVs are utilized for "dynamic" data within the control application. An example of dynamic data is current zone temperature. The NVs are the primary mechanism by which data is exchanged between control and monitoring nodes on the network. The CPs are utilized for "static" data. A CP can be configured as one of two entities, a configuration property type (CPT) or a configuration network variable (CNV). A CNV follows rules established for NVs and count against the limit of NVs that can be used with a particular node. However, a CPT is not so limited, since the CPT ultimately resides within the device. Thus, limitations as to number and size for CPs associated with a node is a function of the memory capacity of the node and the processor associated with the node.

The static data of CPs are typically stored in a controller's non-volatile memory and can be used to configure the application and/or control parameters within the controller. Static data can be used to configure, for example, input and output configuration and set points. NVs and CPs are identified, among other things, by a name and a type. The "name" identifies the class of sensor, such as a temperature sensor. A data "type" defines the units, scaling and structure of the data being passed. A number of standard NV types (SNVTs) and CP types (SCPTs) have been created for commonly used types. Additionally, the LONTALK protocol allows for user defined NVs and CPs, referred to as UNVTs and UCPTs. Collectively, the NVs and CPs within a LONWORKS Controller are referred to as the Node Interface. In addition, NVs and CPs within a controller may be organized and/or associated with Objects.

The application layer programming for LONMARK devices is object-oriented, hence the grouping of NVs and CPs into Objects. An Object is a modular segment of code that performs a documented function using defined inputs and producing defined outputs. In a given device, one or more Objects may be grouped together to perform the function(s) of the device. The Node Interface for a device is thus the amalgamation of the NVs and CPs of all of the objects programmed into the device, along with defaults and power-up behaviors In the LONTALK protocol there are two types of defined Objects, generic LONMARK Objects and LONMARK functional profiles. A generic LONMARK Object may be a sensor that can be used in a number of different applications such as lighting, security, or a manufacturing system. A LONMARK functional profile is an Object that is defined within a specific application. For example, in the HVAC area, a controller used to control a damper actuator based upon a control algorithm using a sensed temperature will require a temperature input and will generate a control output. Accordingly the functional profile for the controller will define the format of a temperature input and the format of the control output. The functional profile will further define optional NVTs and CPTs. Manufacturers may choose to include any number of the optional NVTs and/or CPTs in a particular device. Therefore, devices from different manufacturers may be based upon the same functional profile, while having different Node Interfaces because of the selection of different optional NVTs and CPTs.

LONWORKS devices include "self-documentation" of the Node Interface requirements of the device that can be read and interpreted by a LONWORKS tool. Recovery and interpretation of the self-documentation from a LONWORKS node is the primary and most rudimentary mechanism by which a LONWORKS tool obtains information on a node's Node Interface. Self-documentation includes a Program Identification (Program ID).

Each Node Interface must be assigned a Program ID. Rules for assigning Program IDs and guidelines for self-documentation are administered by the LONMARK Interoperability Association and may be found in LONMARK Application Layer Interoperability Guidelines. In accordance with those guidelines, nodes containing the same Program ID must contain the same Node Interface. Thus, it is assumed that LONWORKS devices with identical Program IDs have identical NV and CP names, the same number of NVs and CPs, identical organization into Objects, etc. Accordingly, when the self-documentation of a node changes, the Program ID of any device at the node must also be changed.

Typically, but not always, descriptive NV names are included in the self-documentation stored within the LONWORKS node as provided by the manufacturer. However, such storage obviously requires memory space. Thus, due to memory constraints, some nodes do not include NV names in the self-documentation stored within the nodes. In such cases, LONWORKS tools must rely on other means for associating an NV with a descriptive name. The most common, and indeed de facto standard for doing so, is to utilize what is known as an External Interface File (XIF file).

The XIF format is determined and maintained by the LONMARK Interoperability Association in the LONMARK Device Interface File Reference Guide. The data in the XIF file includes a Program ID. A Program ID is an identifier for a device that includes a manufacturer identification, a device class, a device subclass and a model number. The device subclass identifies the device as having a specific functional profile. Thus, all devices within the same device subclass must have the same functional profiles. However, by identifying a specific model number, the Program ID further identifies the specific Node Interface for the device. The XIF file is thus a text file description of the Node Interface that can be used by tools to provide access to an application's Node Interface without the need to retrieve the data from the actual node.

A network management tool may be used to obtain the Node Interfaces of the various devices when initially installing a system. The network management tool is a program loaded into a computer, which may be, for example, a portable computer, a handheld device, or an administrative computer connected to the system. The network management tool may be identified as a special node on the system.

After the Node Interfaces are determined for the devices in the network, a process referred to as "binding" is performed. The binding process establishes the logical connection between the devices by connecting the NV Outputs (NVOs) from one node or nodes to the NV Inputs (NVIs) of the same type on another node or nodes. From a network perspective, the devices can thus be thought of as nodes having specific configurations. The logical connections are then stored within the network management database used by the system. Typically, this file is called a Network Management Database or a Network Configuration Database. The logical connections are further stored in the network image of the node. The network image of the node is the configuration table maintained by the node to identify messages on the network that are to be received by the node and to identify outputs that the node is to transmit.

When a replacement device is connected to the system, the network image of the replacement device must be established and stored both in the replacement device and in the network management database. If the replacement device is identical to the previous component, i.e. the same Program ID, establishing the network image may be fairly simple. Some network management tools have the capability of verifying the Program ID, and merely configuring the replacement device using previously defined data by copying the former network image into the new device.

However, in the event the replacement component has a different Program ID, prior art network management tools assume the node to be completely different, and do not automatically attempt to establish the logical connections to the device or provide CPs to the replacement device. Thus, even if the replacement device uses an identical functional profile but is provided by a different manufacturer or even if the device is from the same manufacturer but has a new model number, there is no automatic attempt to configure the node using previously defined data.

Moreover, if the original network management database is not available and a network image cannot be recovered by the network management tool following some damage to the node, then the new node must be manually configured. The design limit for host-based nodes is 4096 NVs, and an unlimited number of CPs. Obviously, manually configuring such a node is labor intensive in engineering and testing.

What is needed is a network management tool capable of automatically re-establishing NV connections and setting the values of CPs even when a node is replaced with a device having a different Program ID. It would be beneficial if the network management tool were capable of identifying conflicts or changes in node configuration, allowing a user to quickly assess the conflicts or changes. It would be further beneficial if the network management tool provided potential conflict resolution options.

SUMMARY OF THE INVENTION

A system made in accordance with the principles of the present invention overcomes limitations previously encountered with the replacement of a node in a system that has already been configured. The system of the present invention includes the capability of storing node configuration values. Once a device at a node has been replaced, the present system may be used to automatically restore logical NV connections and write CP values to the replacement device. The actions performed or proposed by the system may also be presented to the installer to inform the installer of the actions and/or to allow the installer to approve actions before they occur. Additionally, any conflicts identified by the system may be presented to the installer for resolution. According to one embodiment, options for resolving the conflicts are also presented.

The system may suitably comprise a technique that defines a minimum set of mandatory NVs and CPs and/or that allows an installer to identify particular NV connections and CPs that are required to match between a former node and the replacement node before automatic connection is performed. Additionally and/or alternatively, a minimum number of NV connections and CPs may be required to match before any automatic operation is conducted. In one embodiment, the proposed actions are presented to the installer for authorization prior to any automatic operation.

The system may further include a technique that updates other devices in the network to reflect changes in the data sent to or passed from a node with a replacement device.

It is an object of some embodiments of the present invention to allow storage in the network of a set of NVs and CPs for a node in a network.

It is an object of some embodiments of the present invention to analyze the stored set of NVs and CPs with the NVs and CPs of a replacement device to ascertain similarities and differences between the two and to update the network based upon the analysis.

A preferred embodiment of the present invention reconfigures the NVs and CPs associated with the replacement device based upon the above analysis.

Optionally, a system according to the present invention allows an installer to identify specific NVs and CPs that must be present prior to reconfiguration.

These and other advantages and features of the present invention may be discerned from reviewing the accompanying drawings and the detailed description of the preferred embodiment of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

DESCRIPTION OF THE INVENTION

Figure 1:
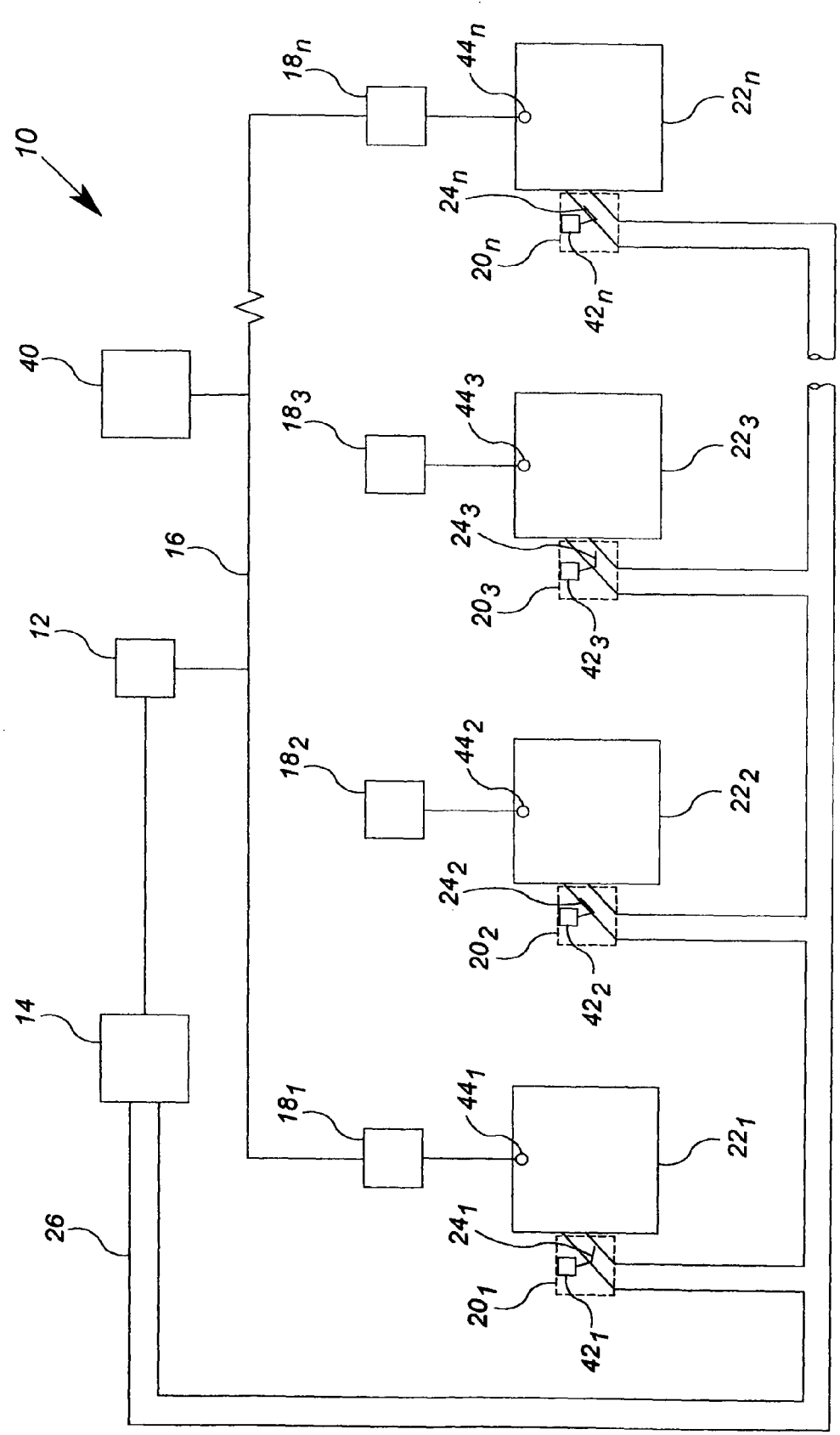
FIG. 1 shows a block diagram of an air distribution system in which the system and the method of the present invention may be used.

FIG. 1 shows an exemplary air distribution system 10 in which an air-handling unit (AHU) controller 12 controls the operation of an AHU 14. The AHU controller 12 is coupled as a sink controller through a network 16 to a plurality of variable air volume (VAV) controllers $18_1 \ldots 18_n$ that operate VAV terminals $20_1 \ldots 20_n$ bringing conditioned air to local spaces $22_1 \ldots 22_n$. The VAV terminals $20_1 \ldots 20_n$ place the dampers $24_1 \ldots 24_n$ in one of a plurality of positions between a fully open position and a minimum allowed open position.

Dampers are typically not allowed to be fully shut in order to ensure there is some fresh air supplied to a space, even if the temperature will be driven out of a desired range. This may be a needed safety measure, for example, to ensure an adequate amount of oxygen is supplied to each space. The minimum allowed open position may thus be set by a CP for the distribution system based upon the most restricted space. That is, the system's minimum allowed open position is established at a value that ensures every space will be above the minimum turnover rate for the most populated space. Of course, this means that most spaces have a minimum allowed open position that is in excess of the actual requirement for that space, leading to system inefficiency.

Returning to the discussion of FIG. 1, the dampers $24_2$ and $24_n$ are in a fully open position, and the dampers $24_1$ and $24_3$ are opened to the system minimum allowed open position as set by a CP. Accordingly, air flow from the AHU 14 through the distribution header 26 to the individual spaces is controlled in a space by space manner within the system.

Figure 2:
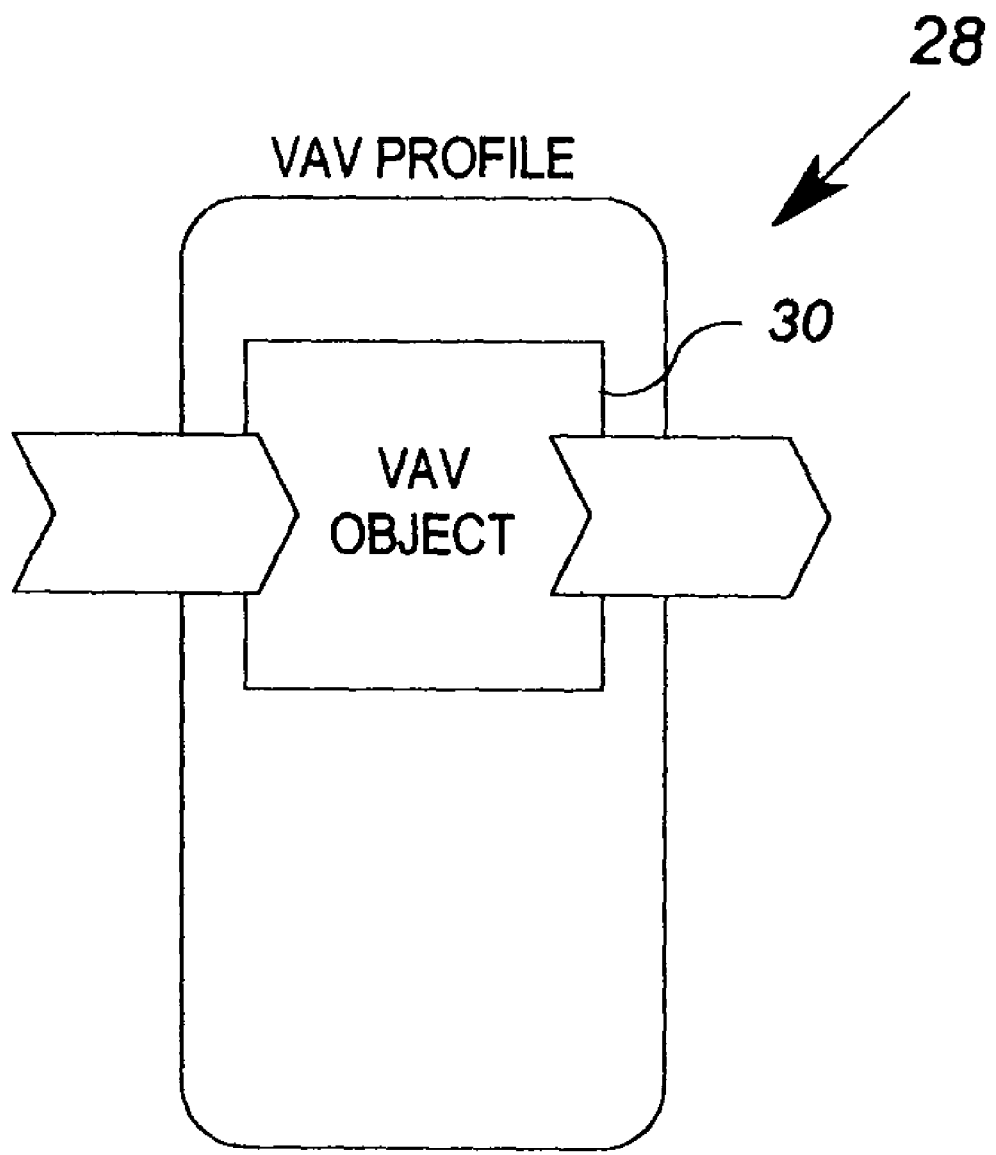
FIG. 2 shows a VAV controller functional profile as defined for a LONMARK VAV controller.

The VAV controllers $18_1 \ldots 18_n$, the AHU controller 12, and the network 16 are, preferably, implemented using LONWORKS technology. To this end, the AHU controller 12 and the VAV controllers $18_1 \ldots 18_n$ are controllers that have passed LONMARK certification and have standard functional profiles, which means at least a portion of the controller's network interface is standardized. The functional profile for a LONMARK VAV controller is shown in FIG. 2. The functional profile 28 includes a VAV object 30 that interacts with one or more of a room temperature node, a remote wall module, a supervisory node, a monitoring node and/or a commissioning node. Damper control, reheat and fan outputs are controlled directly through hardware outputs.

Figure 3:
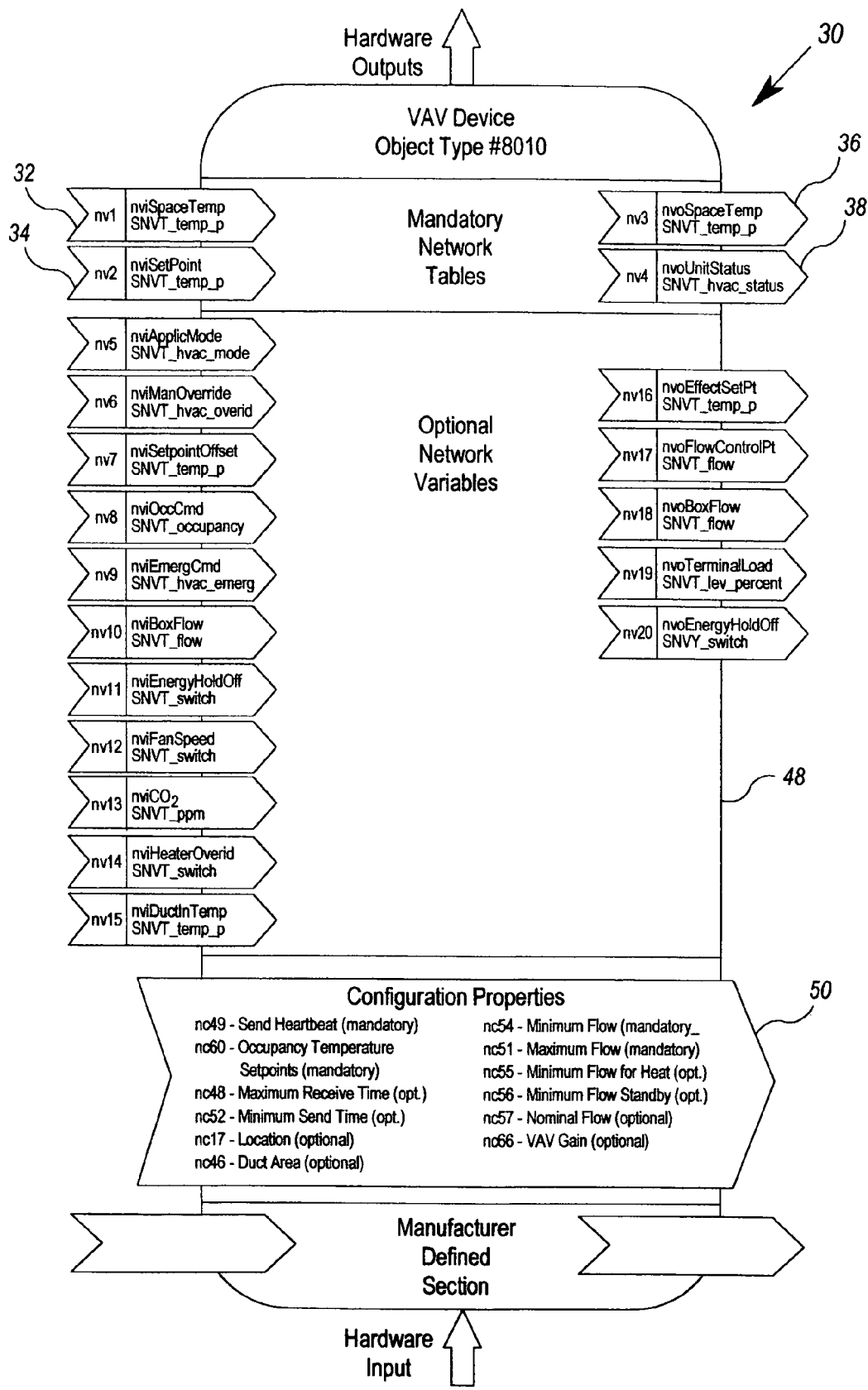
FIG. 3 shows the object details of the VAV controller functional profile of FIG. 2.

The object details for a LONMARK VAV controller are shown in FIG. 3. The VAV object 30 includes two mandatory NV inputs, the NVI 32 and the NVI 34, and two mandatory NV outputs, the NVO 36 and the NVO 38. The VAV object 30 also includes eleven optional NVIs and five optional NVOs shown in optional network variable section 48. There are also twelve configuration properties defined for the VAV object 30 in the configuration properties section 50, some of which are mandatory and some of which are optional.

Accordingly, the network interface includes NV inputs, NV outputs, and CP values. The network management database for the network 16, which includes a stored copy of all of the logical connections between the devices in the network 16, is stored in the network computer 40. The network 16 is, preferably, a LONTALK network. NEURON, LONMARK, LONTALK and LONWORKS are all trademarks of Echelon Corporation of Palo Alto, Calif. By way of example, the controllers may suitably comprise NEURON® micro-controller, originally developed by Echelon Corporation of Palo Alto, Calif.

As shown in FIG. 1, the VAV controllers $18_1 \ldots 18_n$ individually control environmental parameters of the spaces $22_1 \ldots 22_n$, respectively, and they all are under the overall control of the AHU controller 12. That is, each of the VAV controllers $18_1 \ldots 18_n$ is coupled to the actuator $42_1 \ldots 42_n$ for the dampers $24_1 \ldots 24_n$, respectively and to the temperature sensors $44_1 \ldots 44_n$. Of course, more sensors may also be included in the system, such as damper position indicators, etc. The AHU controller 12 communicates with the VAV controllers $18_1 \ldots 18_n$ over the network 16 to synchronize their operation in controlling airflow and other environmental parameters in the respective spaces, so the parameters of the spaces correspond to set point conditions stored in the controllers. Typically, in order to coordinate their operation, the AHU controller 12 also requires status data from the VAV controllers $18_1 \ldots 18_n$ regarding parameters in their respective local spaces and the position of the dampers.

Figure 4:
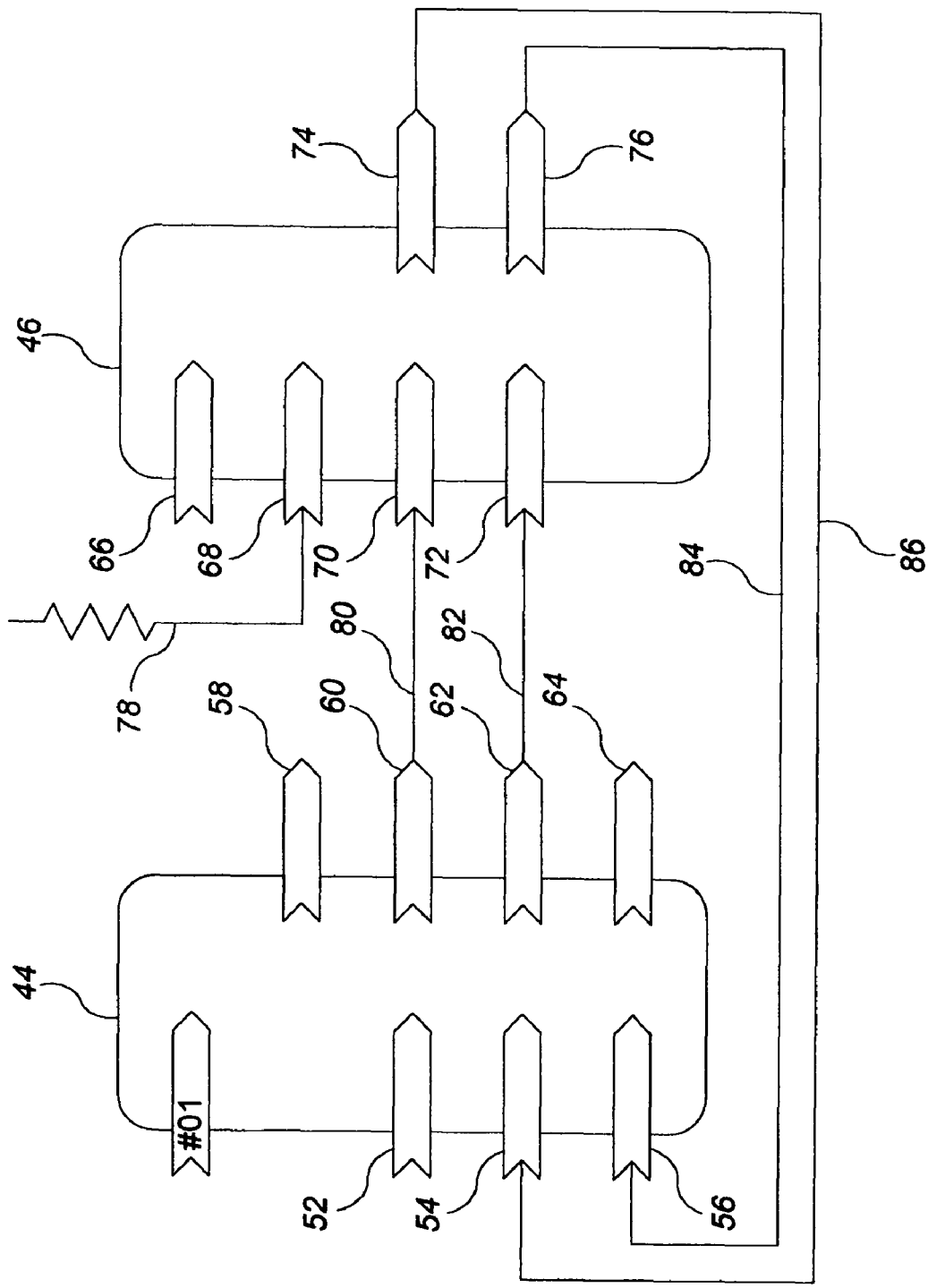
FIG. 4 shows a representation of the object details of the AHU controller of FIG. 1 and a VAV controller of FIG. 1 with logical connections drawn between the inputs and outputs.

Accordingly, when the network 16 was initially installed, the logical connections between the devices were defined and stored in the network management database maintained in network computer 40 as well as in the network image within each of the nodes. By way of example, FIG. 4 shows a representation of the object details 44 and 46 of the AHU controller 12 and the VAV controller $18_1$, respectively. The object detail 44 includes the NVIs 52, 54 and 56 and the NVOs 58, 60, 62 and 64. The object detail 46 includes the NVIs 66, 68, 70 and 72 and the NVOs 74 and 76. The logical connections 78, 80, 82, 84 and 86 are also shown connecting various NVOs of each obect detail 44 and 46 to NVIs of the other object detail 44 and 46.

The logical connections shown between the object details 44 and 46 are not actual independent physical connections. Rather, the connection of object details with logical connections is a tool that can be used to represent the types of messages that can be sent and received by a device in accordance with the logical connections stored in the network management database of the network on computer 21 and the network image of the node. In practice, all of the messages put onto the network 20 are accessible to all of the devices on the network 20. However, a particular device will only process messages that are addressed to the particular device.

Specifically, a logical connection is made by setting an address of a receiving device in the address table of a sending device along with a selector in the sending device's NV configuration table, and then setting the same selector in the NV configuration table of the receiving device. Therefore, when the sending device sends a message to the network with a particular address and selector, the receiving device recognizes the address and matches the selector and reads the message. Accordingly, while terms and words may be used herein that ascribe a number of unique physical connections between the nodes, this is done only to provide an understanding of the present invention and not as a limitation of the present invention.

In this embodiment, the VAV controller $18_1$ includes a CP which establishes the minimum flow through the damper $23_1$ of the VAV terminal $22_1$. Thus, the VAV controller $18_1$ is designed to accept a CP indicating that the VAV controller $18_1$ should cause its associated terminal to be positioned such that the minimum flow is achieved, and another CP indicating the temperature at which the VAV controller $18_1$ is to maintain the space $24_1$. In practice, a number of additional logical connections would be made between the AHU controller 12 and the VAV controller $18_1$ as well as between these devices and other devices.

The two mandatory inputs for the VAV controller $18_1$, NVIs 68 and 70 are received through the logical connections 78 and 80. The mandatory inputs for the VAV controller $18_1$ are provided from the AHU controller 12 through the network 16. The NVI 68 is received from a temperature sensor node (not shown) through the logical connection 78. The NVI 70, which is the temperature set point, is received from the NVO 60 of the AHU controller 12 through the logical connection 80. An optional NVI 72 is received from the NVO 62 through the logical connection 82. The two mandatory outputs for the VAV controller $18_1$, NVOs 74 and 76 are received as NVIs 54 and 56, respectively, of the AHU controller 12 through the logical connections 86 and 84. The AHU 12 is informed of the status of the VAV controller $18_1$ through the mandatory outputs. Specifically, the NVO 74 provides the current temperature of the space $24_1$ and the NVO 76 provides the status of the VAV controller $18_1$.

In addition to logical connections to other controllers, the AHU controller 12 may also have some additional functional capabilities which are not used. For example, one or more NVO's may not be bound to another device. One such capability is represented in FIG. 4 as the available optional NVO 64. The optional NVO 64 is discussed below.

Figure 5:
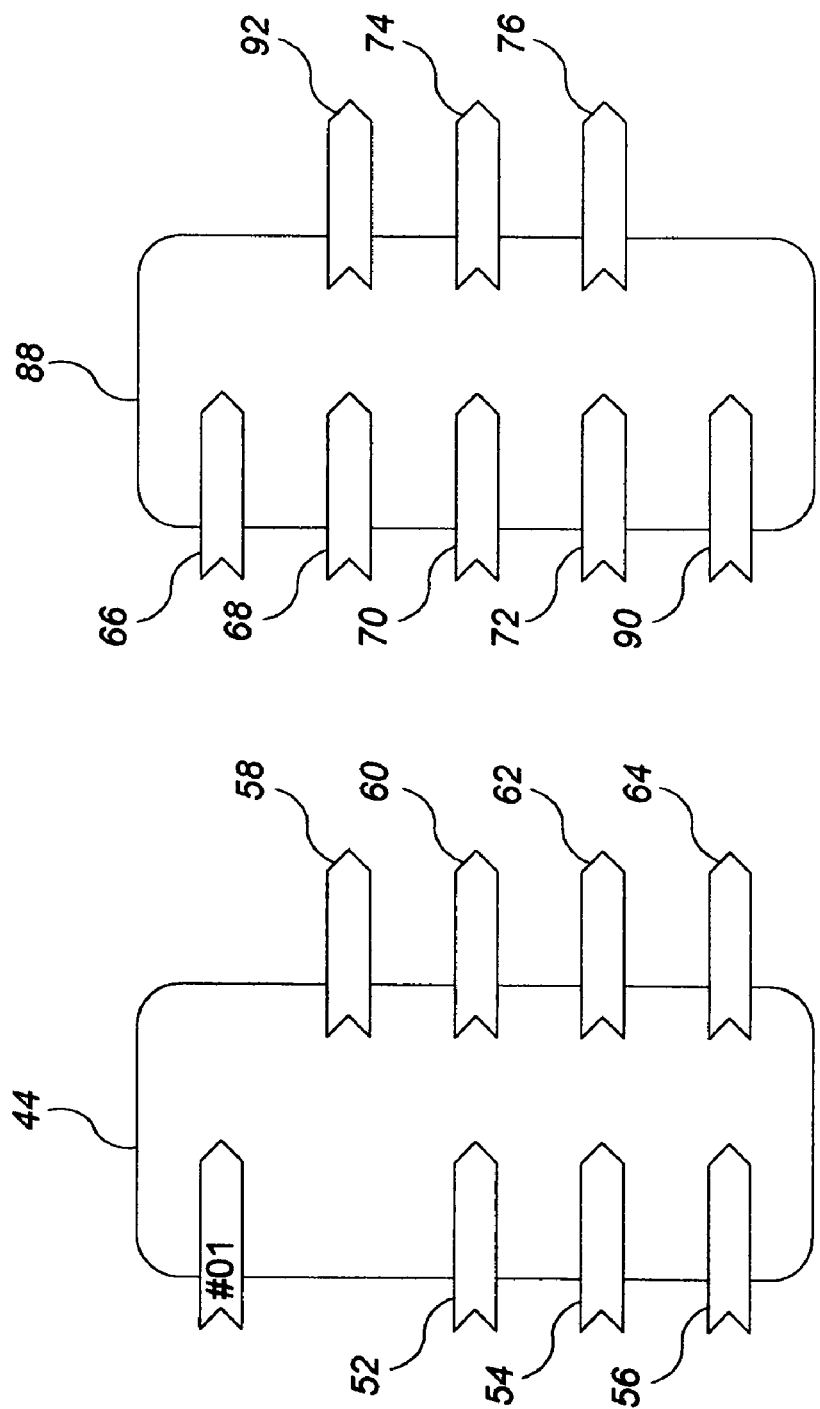
FIG. 5 shows a representation of the object details of the AHU controller of FIG. 1 and a replacement VAV controller that will replace the VAV controller of FIG. 4.

FIG. 5 shows a partial representation of the object details 44 and 88 of the AHU controller 14 and a replacement VAV controller, respectively. The replacement VAV controller is to be installed into the network 16 as an upgrade at the node previously occupied by the VAV controller $18_1$. The replacement VAV controller in this embodiment is capable of changing the set point used by the controller to control the temperature of a space by a commanded offset. Using an offset to change the set point over the network is typically done when a supervisory node is providing outside air temperature compensation or when it is desired to allow a wall module change the set point temperature of the space when the space is occupied.

The replacement VAV controller includes all of the inputs and outputs that were present in the VAV controller $18_1$. This is indicated in FIG. 5 by using the same reference numbers for the object detail 88 as were discussed above with respect to the object detail 46. The set point offset capability is indicated in FIG. 5 by the available NVI 90 and the NVO 92. The NVI 90 receives the offset amount while the NVO 92 reports the effective set point.

Figure 6:
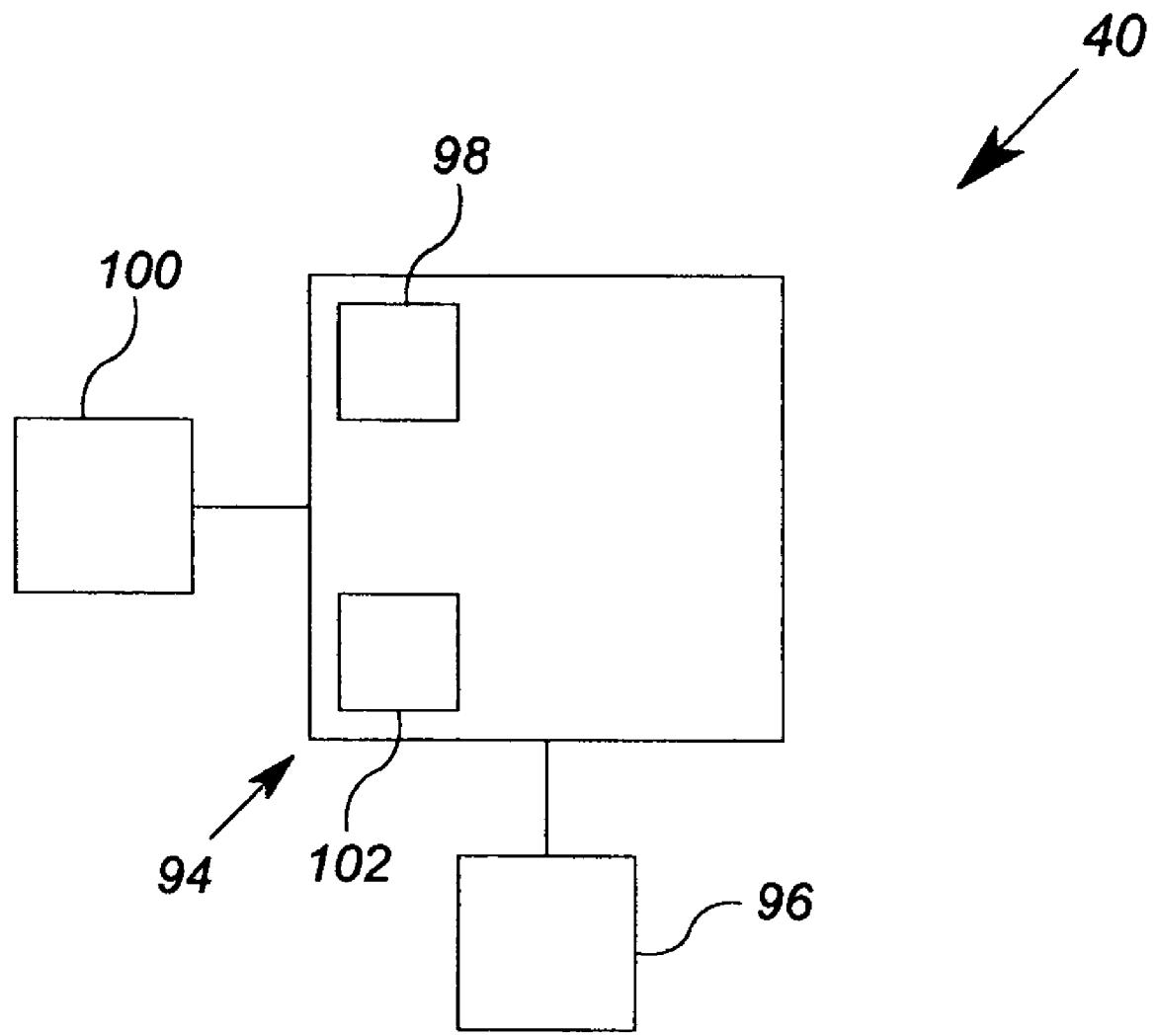
FIG. 6 shows a block diagram of an embodiment of the present invention.

In accordance with one embodiment of the present invention, a network management tool is used to assist in establishing or reestablishing logical connections between the replacement controller and the network 16. The network management tool in this embodiment is shown in FIG. 6 as part of the computer 40. The network management tool 94 includes the user input device 96, a read/write memory 98, a display 100 and a processing circuit 102. The processing circuit 102 includes a storage media with instructions for various operations stored therein. Some of the operations are discussed below.

A number of alternative embodiments for the network management tool are possible within the scope of the present invention. By way of example, but not of limitation, the network management tool may be in the form of a handheld device, portable computer, or a remote computer operably connected to the network 16. Other embodiments may include a communications interface configured to connect to the computer 40 or some other part of the network 16. The invention may alternatively be a configuration tool that operates independently of a network management tool. In such embodiments, it is critical to provide an updated status of any configurations made or modified by the configuration tool to the network management database as discussed below.

The operation of a network management tool 94 is explained more fully below, however, a brief description of the operation of the network management tool 94 is provided here in conjunction with a description of the object details shown in FIG. 4 and FIG. 5.

Initially, the network management tool 94 stores the logical connections associated with the node for the VAV controller $18_1$. Storage may be in the form of dedicated memory or any other memory with which the network management tool may work including the network management database of network 16. Preferably, the logical connections are stored by copying the network image from the node being replaced. Accordingly, the address table, NV configuration table, domain table and other data for the node is obtained. In this embodiment, the network management tool 94 stores the data in read/write memory 98.

The network management tool then acquires the Program ID of the replacement VAV controller $18_1'$ and compares it to the Program ID of the VAV controller $18_1$. In this example, the Program IDs do not match. Accordingly, the network management tool 94 acquires the node interface of the replacement VAV controller $18_1'$ including the object details 88 of FIG. 5. The network management tool 94 then verifies that the name and SNVT associated with NVIs 66, 68, 70 and 72 and NVOs 74 and 76 of the VAV controller $18_1$ are also present in the replacement VAV controller node object details.

Figure 7:
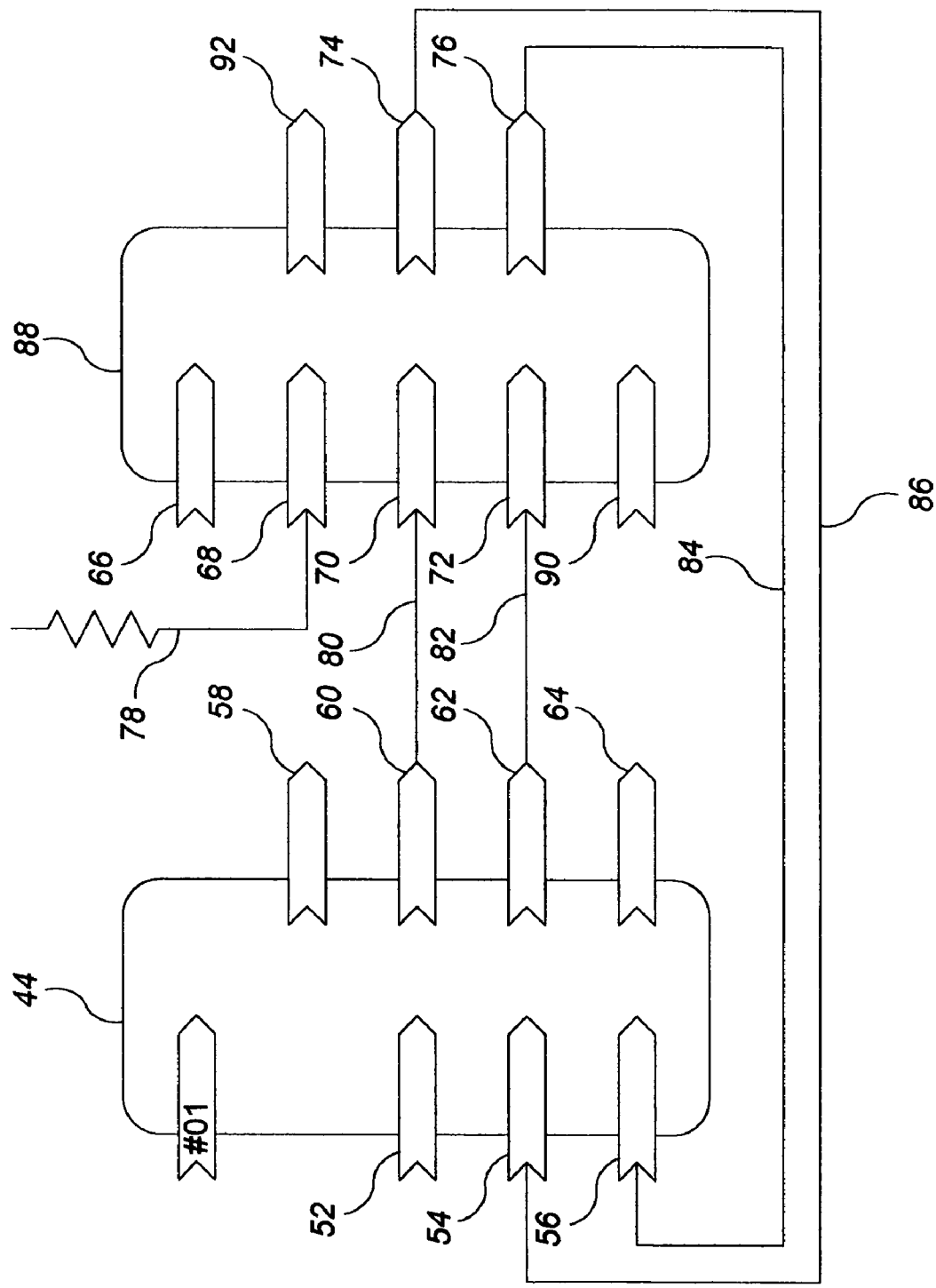
FIG. 7 shows a representation of the object details of FIG. 5 showing the logical connections between the object details.

The network management tool 94 then "re-establishes" the logical connections in the network with the replacement VAV controller by creating a network image in the replacement VAV controller reflective of the network image that was in the VAV controller $18_1$. Thus, as shown in FIG. 7, the logical connections 80, 82, 84 and 86 are reestablished between the AHU controller 12 and the node that now comprises the replacement VAV controller and the logical connection 78 between the temperature sensor node (not shown) and the replacement VAV controller.

Those of skill in the relevant art will appreciate that the complimentary storage of the logical connections associated with replacement VAV controller $18_1$ in the network management database may be accomplished by simply not overwriting certain portions of the network management database. The actual file maintenance/creation being a design choice.

The CPs used by the replacement VAV controller are also obtained by the network management tool 94. The CPs may be obtained through a device resource file that is provided by the manufacturer of the replacement device. To the extent the replacement VAV controller uses only SCPTs, the CP values may be readily installed. If the replacement VAV controller includes UCPTs, the network management tool 94 checks the stored network image of the VAV controller $18_1$ if the replacement VAV controller is from the same manufacturer. If the two devices are from the same manufacturer and identify a UCPT of the same name and type, then it is likely that the same input is intended. In such a circumstance, the previous value is used for the replacement VAV controller and the operator is informed of this action.

If the replacement VAV controller is from a manufacturer other than the manufacturer of the VAV controller $18_1$, then the needed UCPT is most likely not identifiable from the stored network image. Accordingly, the network management tool 94 informs the operator that operator input is needed to define the new UCPT for the network 16.

In the event the replacement VAV controller includes the same NV types and algorithms as the VAV controller $18_1$, then once the above logical connections have been made and the CP values written to the replacement device, the system may be restored to the operational condition that existed before the VAV controller $18_1$ was removed from the system. FIG. 7 shows, however, that the NVO 64 and the NVI 90 have not been bound. The NVO 64 is an output used for a message that includes a set point offset. The NVO 64 was not previously bound to the VAV controller $18_1$ because the VAV controller $18_1$ did not have a corresponding capability. As noted above, the NVI 90 is provided to allow the replacement VAV controller to receive a set point offset.

Additionally, the NVO 92 relates to an output message informing addressees of the effective set point being used by the replacement VAV controller. The SNVT and name of the NVO 92 match the SNVT and name of the NVI 52. Thus, after installing replacement VAV controller $18_1$', the network 16 may be upgraded to allow for modification of the temperature set point used by the replacement VAV controller by logically connecting the above discussed inputs and outputs.

Figure 8:
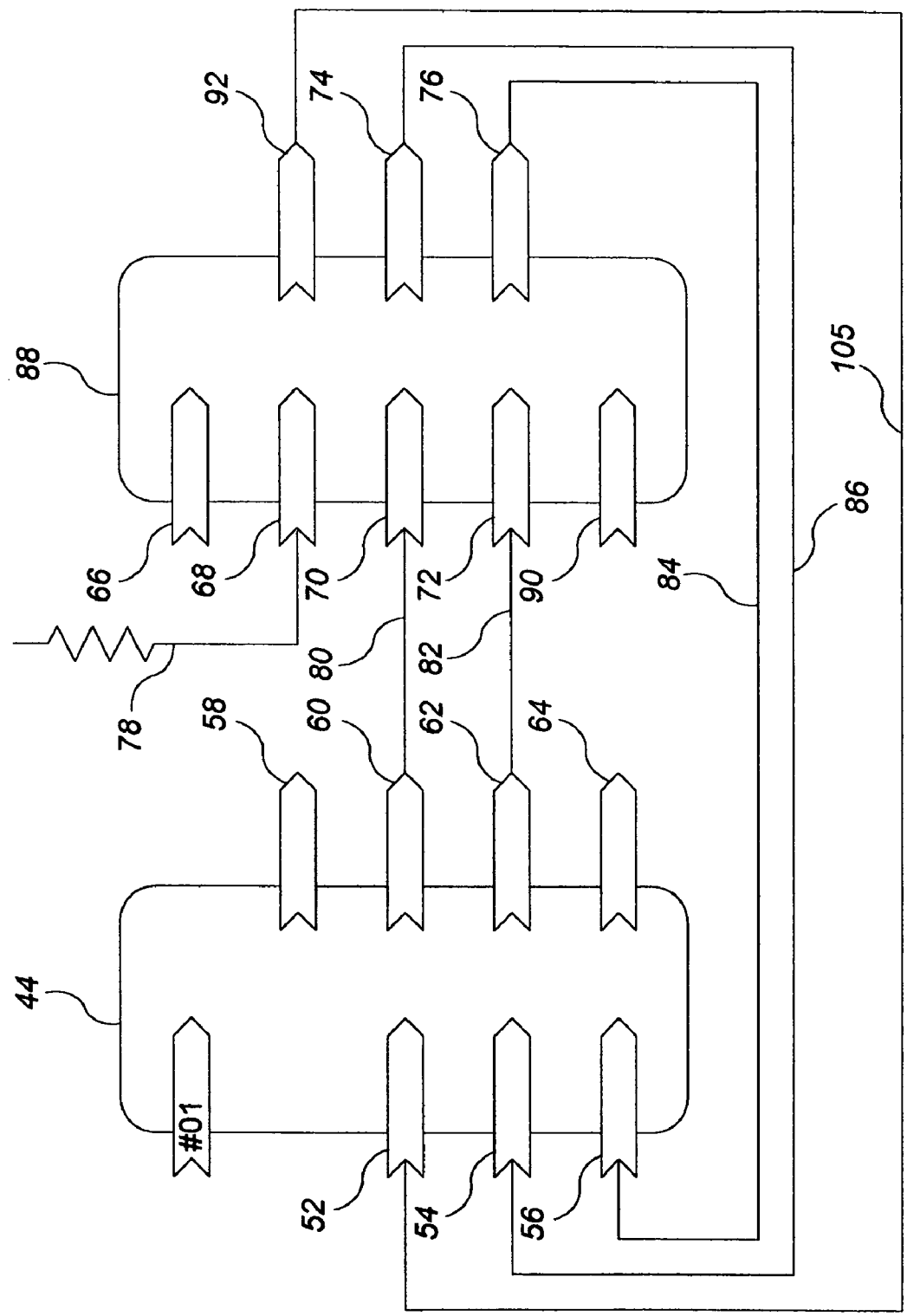
FIG. 8 shows a representation of the object details of FIG. 5 showing an additional logical connection between the object details as compared to the logical connections between the object details shown in FIG. 7.

In accordance with one embodiment of the present invention, after performing the above operations, network management tool 94 is programmed to further analyze the devices remaining in network 16 along with VAV controller $18_1$' to determine if any new capabilities have been enabled by installing the replacement VAV controller $18_1$'. This analysis reveals that NVO 64 and NVI 90 have matching names and SNVTs. Accordingly, this fact is presented to the installer using any user interface tool, a number of which are well known in the relevant art. The installer may then allow the network management tool 94 to establish the logical connection needed to upgrade to the new functionality. This is shown by logical connection 104 shown in FIG. 8. Similarly, the NVO 92 and NVI 52 are logically connected as indicated by the logical connection 105

Figure 9:
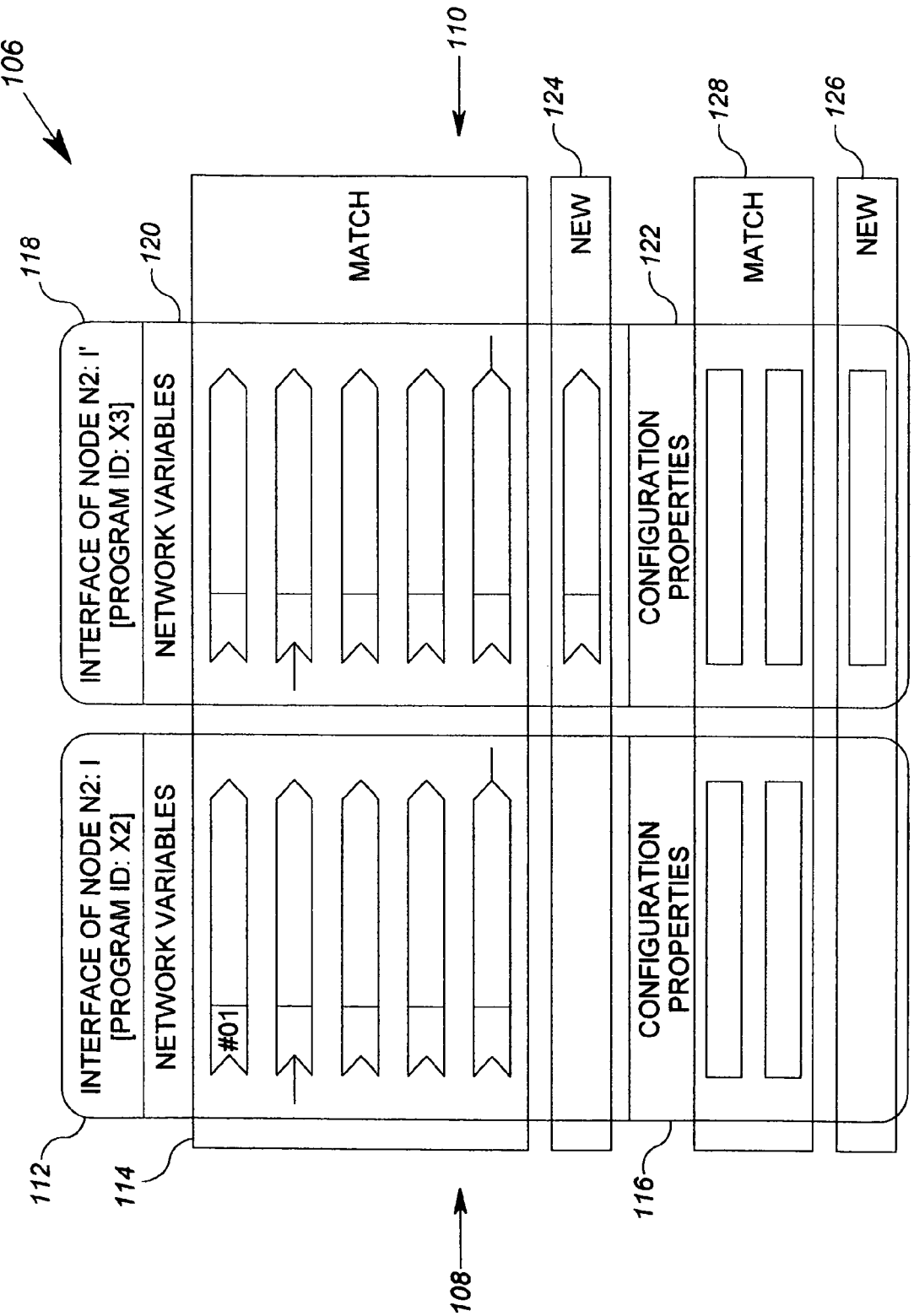
FIG. 9 shows an embodiment of a display of a comparison by a network management tool between the node interface of a saved device and a replacement device in accordance with the present invention.

Referring now to FIG. 9, a screen displayed to an installer in accordance with one embodiment of the present invention is described. In this embodiment, the network management tool is programmed to configure logical connections for a replacement device, even if the connections are new. Once the logical connections have been made, screen 106 is displayed to an installer on the display 100.

Screen 106 comprises original node configuration window 108 and updated node configuration window 110. Original node configuration window 108 comprises node and device identification field 112. From field 112, the installer is informed of the node that has been updated, node "N2:I", along with the Program ID for the device originally installed at node N2:I which in this example is "X2". "N:2" identifies the node, while the letter "I" indicates that the connections shown below field 112 were associated with the initial node configuration. The original NVs as stored in the network management database or network image are displayed in the NV field 114 and the original CPs are displayed in the CP field 116. The original node configuration window 108 thus provides the installer with complete information as to the original device previously located at node N2:I, and the system functionality provided by the original device.

Similarly, the updated node configuration window 110 comprises a node and device identification field 118. The field 118, informs the installer that the node configuration has changed, as indicated by the identification of the node as "N2:I'" "I'" being a first update of the node. The installer is further informed that the Program ID for the replacement device installed at node N2:I is "X3". Because the Program IDs in fields 112 and 118 do not match, the installer knows that a connection by connection analysis of the logical connections available with the replacement device has been performed by the network management tool. Additionally, it may be desired to provide a warning if the network management tool 94 determines that the manufacturer identification in the Program ID has changed. This may desired even if all of the input NVs and CPs are the same, since the actual algorithms using the inputs may differ from manufacturer to manufacturer, and thus, the functionality of the node may be changed even if all inputs and outputs are the same name and type.

The NVs for the updated node that are the same as the NVs shown in the NV field 114 of original node configuration window 108 are displayed in the NV field 120 as a "match". Similarly, the CPs for the updated node that are the same as the CPs shown in the CP field 116 of the original node configuration window 108 are displayed in the CP field 122 as a "match" 128. In this example, a new NV is associated with the updated node and attention drawn to this by the use of "new" in the new NV field 124. A new CP is associated with the updated node and attention is drawn to this by the use of "new" in the new CP field 126. The installer is thus informed that new system functionality has been provided with the installation of the replacement device.

Those of skill in the art will appreciate that data may be displayed to an installer in a number of ways. By way of example, but not of limitation, the data may be displayed in text form, on an alpha-numeric display, or graphically. Moreover, the display need not incorporate all of the data shown in the screen 106. These modes of display and others are within the scope of the present invention. Nevertheless, the screen 106 has additional advantages of intuitively presenting relevant data by highlighting changes while providing full detail of the nodal configuration both prior to and after installation of the replacement device.

Figure 10:
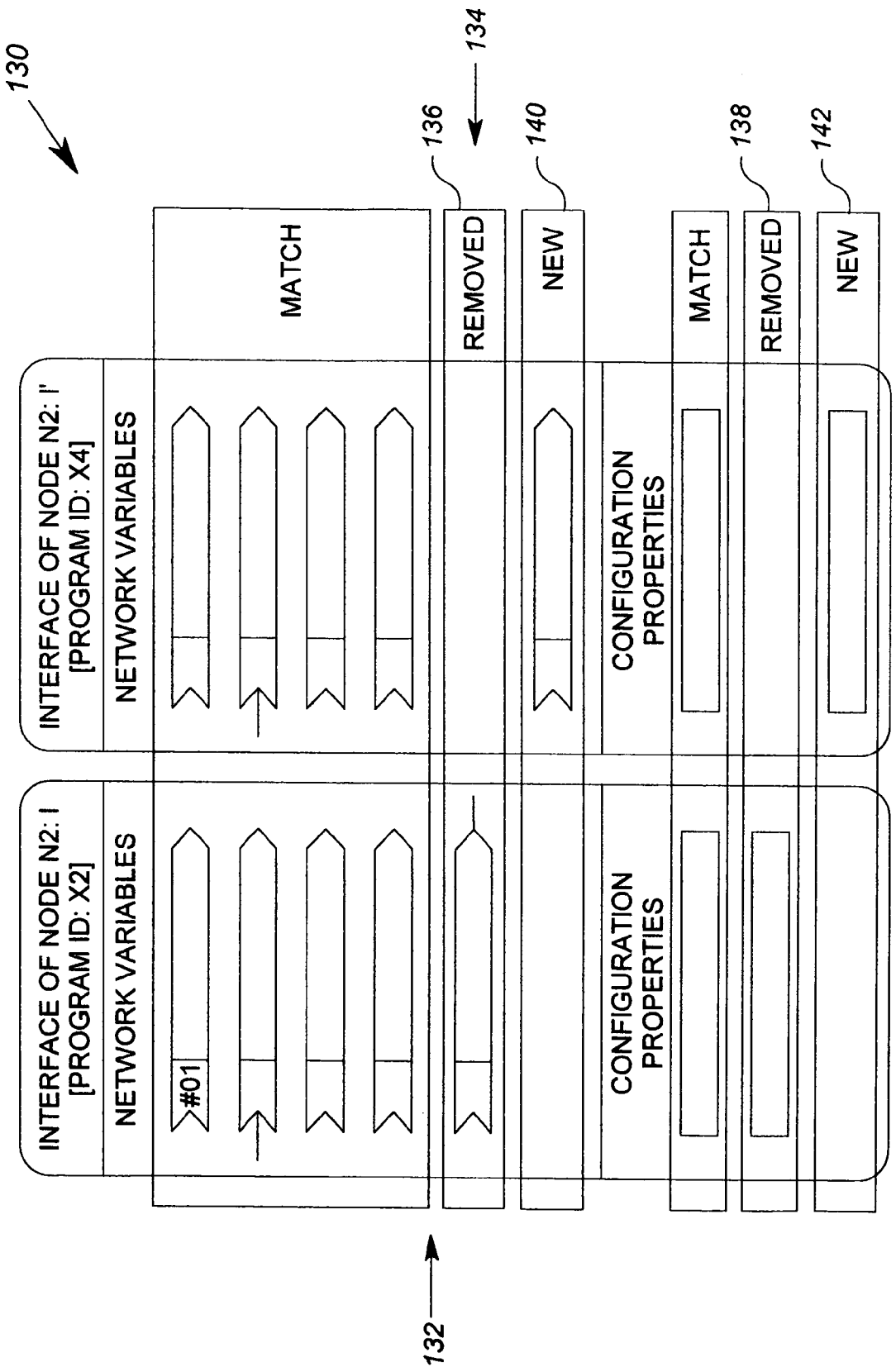
FIG. 10 shows an embodiment of a display of a comparison by a network management tool between the node interface of a saved device and a replacement device in accordance with the present invention.

FIG. 10 shows an exemplary screen displayed when new NV and CP connections have been added to a node while some original NV and CP connections have been removed. Screen 130 comprises original node configuration window 132 and updated node configuration window 134. The nodal information shown in original node configuration window 132 is the same as the information shown in original node configuration window 108 of FIG. 9. In the example of FIG. 10, however, a different device was used to replace the original device. This is indicated by Program ID "X4" in the updated node configuration window 134. In this example, NVI 136 and CP 138 are highlighted as being "removed" from the node while NVI 140 and CP 142 are highlighted as being "new" to the node.

While not shown in FIG. 10, those of skill in the art will appreciate that within the scope of the present invention, a variety of data could be presented to the installer by a network management tool. By way of example, but not of limitation, a comparison display need not include a listing of all NVs and CPs that matched. Additionally, more detail may be displayed with respect to the NVs and CPs that do not match.

Moreover, because, as a design choice, NVs and CPs need not be identical, the differences within "matching" NVs and CPs may be displayed. Specifically, in one embodiment of a system comprising the present invention, NVs that are input to a device include a number of attributes such as name, identifier, index, type, and proprietary information. Of these attributes an installer may define a subset of attributes that the network management tool must match before establishing logical connections.

For example, as discussed above, an NV "name" field may identify the nature of the sensor, such as a "temperature" sensor while the "type" field identifies characteristics such as units and scaling. In many instances, other fields, such as the proprietary information field, will not alter the functionality of the node. Accordingly, if an installer defines only name and type as being required to "match" for a particular NV, then the network management tool may establish logical connections even though all of the fields within the NV of a replacement device do not match the fields for the original device. In this scenario, it may be useful as a double check on the newly established connections to highlight to an installer the fields that did not match. Similarly, differences between matching CPs may be displayed.

Referring again to FIG. 10, the logical connection for the NVI 140 is established in the manner discussed above with respect to FIGS. 5, 7 and 8. Assuming no further actions are taken, the functioning of the replacement device in this embodiment will not be affected by the fact that the NVI 136 is not being used. However, the system may be adversely affected if no further action is taken. For example, the device sending the data that was received as NVI 136 is programmed to send the message in accordance with its network image, to the node newly occupied by the replacement device. Accordingly, when the sending device determines that the message correlating to NVI 136 is to be sent, a message is sent onto the network 16 addressed to the former device of the replaced node.

However, the replacement device has not been bound to receive the message. Therefore, the replacement device will determine that the message is not intended for it, and will not receive the message. Depending on the type of message, the sending device may send the message a number of times and then generate an error message.

The foregoing activity presents a problem for the network 16. Specifically, the network 16 is designed to have one message at a time transmitted or broadcast to the network. Then, every device on the network 16 analyzes the transmitted message to establish whether or not the device is an addressee. A device that needs to send a message onto the network 16 is thus programmed to first listen to ensure there is no other traffic on the network, and to transmit its message only when the network 16 is not busy. Accordingly, when a message is sent that does not have a valid addressee, the network 16 is unnecessarily loaded. This results in a degradation of the efficiency of the system.

In accordance with one embodiment of the invention, the network management tool 94 is further programmed to reduce unnecessary traffic on the network 16. This is accomplished by not only configuring logical connections within the replacement device, but also by evaluating the NVIs and NVOs that have been removed, and updating the network image of other devices on the network 16 so as to remove the related NVIs and NVOs from the other devices.

The network management tool 94 accomplishes the network update by first checking the address table entry for the removed NV in the network image of the sending device. If the NV was sent from one device to a single receiving device, then the address table for the sending device will include a subnet ID and node ID identifying the single recipient. Accordingly, if the replacement device no longer receives the NV, the corresponding entry in the sending device's address table may be deleted to eliminate unnecessary traffic. If the replacement device is no longer sending the NV, then the network image of the receiving device that remains in the network 16 is updated so that it does not look for the NV.

In the event the sending device identifies a group ID, then the NV may have been received by more than just one receiving device. Accordingly when the network management tool 94 identifies a removed NVI for a node as being sent to a group by a sending device, the network management tool 94 searches the network to determine whether any remaining devices in the network include entries in their NV configuration tables identifying the removed NV as an NV to be received. Only if no other such device is located will the network management tool 94 delete the entry from the sending device's network image.

If the removed NV is an NVO that is sent to a group by the node, the network management tool 94 searches the network to determine whether any remaining devices in the network 16 include entries in their NV configuration tables identifying the removed NV as an NV to be sent to the network 16. If no other devices are sending the NV to the network 16, then the network management tool 94 searches for any devices in the network 16 that are configured to receive the NV, and deletes the entry from the receiving device(s)'s network image. In other words, if the removed device was the only device in the network 16 providing the NV as an output, then the remaining devices can no longer receive the NV. Therefore, entries in the remaining nodes' network image related to receiving the removed NV, such as the address tables and selectors associated with the removed NV, can be deleted.

The network management tool 94 may further be programmed to copy any desired remaining portion of the previously stored network image of the replaced device into the network of the replacement device.

Although the foregoing embodiment included a configuration tool that was a part of the network management tool, the configuration tool may alternatively be embodied as a standalone tool. In such embodiments, it is important to ensure that the network management database is updated with any actions undertaken by the configuration tool altering the network images of the nodes in the network 16.

Figure 11A:
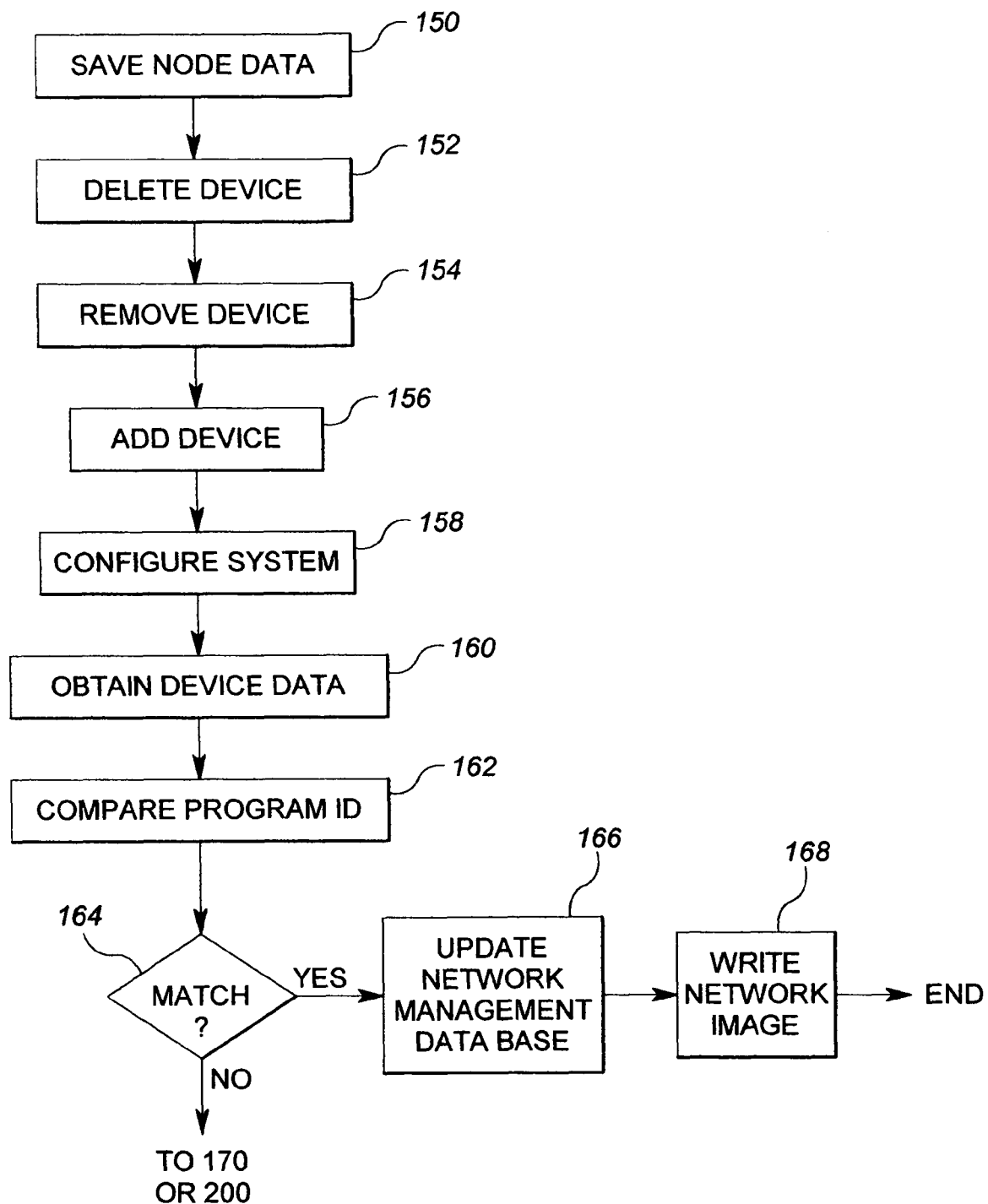
FIGS. 11a and 11b are a flowchart of an exemplary method that may be used to implement the principles of the present invention in a network management tool.

Referring now to FIG. 11a, a flowchart of an exemplary method that may be used to implement the principles of the present invention is shown. In this embodiment, the network management tool has been programmed by the installer to call CPs and NVs having identical names and types a "match." In general, the program will first check the Program ID of the replacement device against the Program ID of the original device. If there is no match, then the NVs and CPs of the replacement device are checked for matches with the nodal configuration of the original device. Any unmatched NVs and CPs will be displayed as new. Any NVs and CPs associated with the original device that are not matched will be displayed as removed. The network management tool will then allow the installer to direct the matched NVs to be re-established by the network management tool. Re-establishment is effected by writing the logical connections in the network management database of the network. The installer may further direct the matched CPs to be written to the replacement device.

Specifically, at step 150, a user of a network management tool embodying the present invention saves the Program ID, CPs and NVs associated with a specific node into memory provided with the network management tool as stored node data. If available, this information may be copied along with the rest of the network image on the device that is to be replaced. At step 152 the device to be replaced is deleted from the system network management database used in conjunction with the network. This file may be located, for example, in a computer used to monitor the network. The device is then physically removed from the system at step 154. When a replacement device has been identified, the device is physically installed at step 156. The device is added to the system configuration at step 158. At step 160, data present on the new device's memory and/or external interface file is retrieved as device data. The Program ID of the new device is then compared to the stored node Program ID from step 150 at step 162. If the node and device Program IDs match at step 164, then the new device is an exact replacement, and the former network image for the node, including logical connections, may be copied to the replacement device. Accordingly, at step 166 the network management database is updated and at step 168 the new device's network image is stored to the replacement device, and the network management tool ends.

Figure 11B:
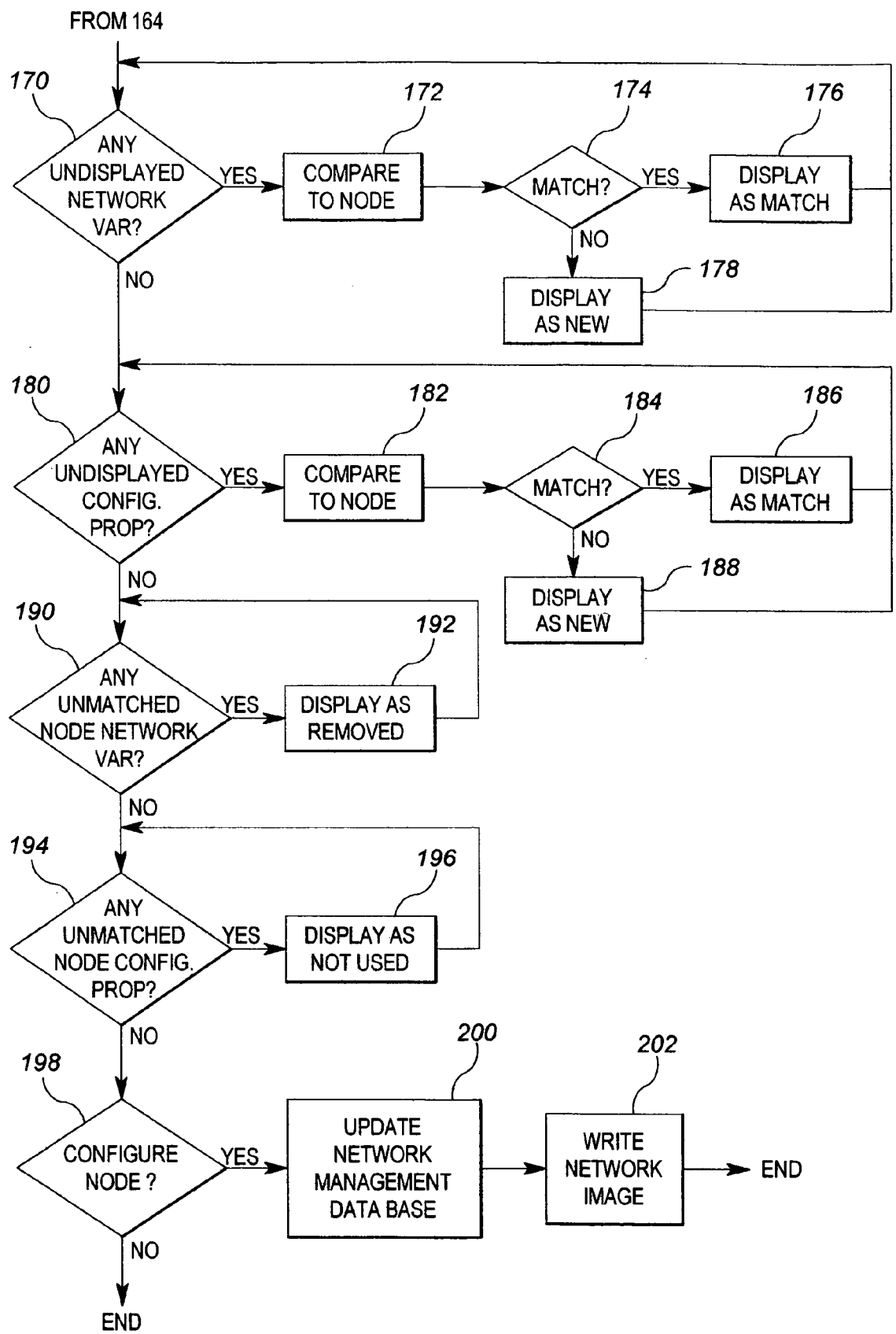

If the Program ID does not match at step 164, the system proceeds to step 170 shown in FIG. 11b. At step 170 the device data is checked for any NVs (NVIs or NVOs) that have not yet been displayed at step 176 or 178. When encountering this step for the first time, since no NVs have been displayed, any NVs in the device data (NVIs or NVOs) forces a "Yes". If an undisplayed device NV is present, then at step 172 the (an) undisplayed device NV is compared to the node NVs stored at step 150. If at step 174 the device NV includes sufficient similarity to a node NV as discussed above, then the device NV and the node NV are displayed as a match at step 176. If the device NV does not match any node NV, then the device NV is displayed as a new NV at step 178. It is "new" because the node did not previously have a logical connection associated with the NV. Thus, it is a newly available functionality or previously unused fucntionality, but not a newly configured functionality. It cannot be configured until a match is defined and a logical connection is made.

The system then continues at step 170 until all device NVs have been displayed at step 176 or step 178. Once all device NVs have been displayed, then at step 180 the device data is checked for any CPs that have not yet been displayed at step 186 or step 188. As with the NVs, for the first iteration, there will not be any displayed CPs, so any device CP forces a "Yes." If an undisplayed CP is present, then at step 182 the undisplayed device CP is compared to the node CPs stored at step 800. If at step 184 the device CP includes sufficient similarity to a node CP as discussed above, then the device CP and the node CP are displayed as a match at step 186. If the device CP does not match any node CP, then the device CP is displayed as a new CP at step 188. It is "new" because the node did not previously require the identified CP.

The system then continues at step 180 until all device CPs have been displayed at step 186 or step 188. Then at step 190 the node data is checked for any node NVs that have not yet been displayed as matched at step 176. If an unmatched node NV is found, it is displayed at step 192 as a removed NV. It is "removed" in the sense that even when the logical connections are re-established, because no "match" has been found, no logical connection for this NV will be made. Thus, the NV will no longer be passed to or from the node, even if the other devices in the network are not updated to reflect the change at the node being replaced. The system then continues to step 190 until all node NVs stored at step 150 have been displayed either at step 176 or at step 192.

Once all node NVs have been displayed, then at step 194 the node data is checked for any node CPs that have not been displayed at step 186. If an undisplayed node CP is found, it is displayed at step 196 as a not used CP. It is "not used" in the sense that it will not be written to the replacement device. However, other devices in the network may still use the CP. The system then continues to step 194 until all node CPs stored at step 150 have been displayed either at step 186 or at step 196.

With all node and device CPs and NVs displayed to the installer as being matched, new or removed, the installer at step 198 chooses whether or not the node should be reconfigured using the identified matches. If it is so desired, then at step 200 the network management database is updated and at step 202 the new device's network image is stored to the new device using the matched CPs and/or NVs and the network management tool ends. Alternatively, the installer may choose at step 198 to terminate the tool without making the connections.

Figure 12A:
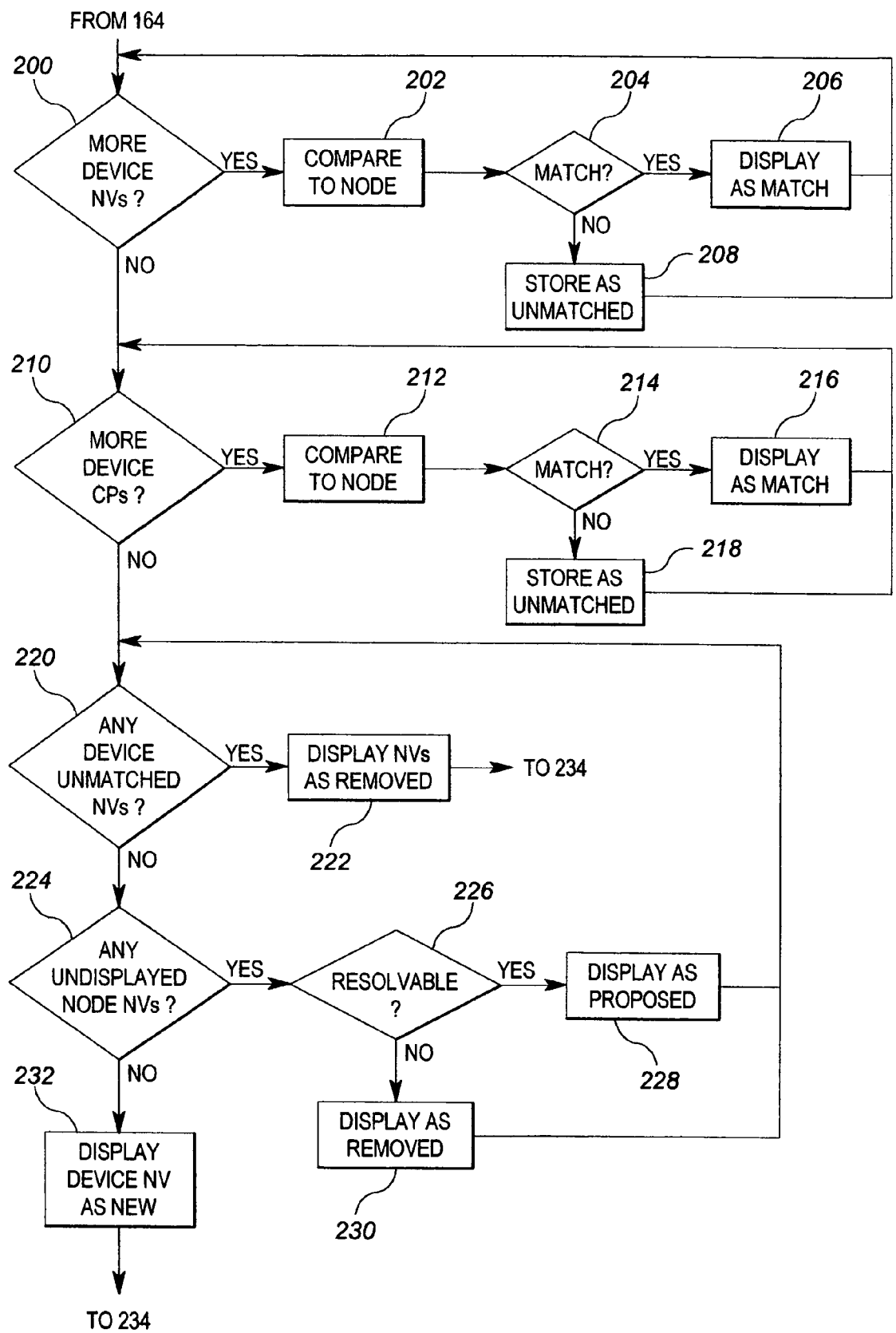
FIGS. 12a and 12b are a flowchart of an alternative exemplary method that may be used in conjunction with the method of FIG. 11a to implement the principles of the present invention in a network management tool.

In alternative embodiments, the present invention proposes possible resolutions of conflicts to an installer. One such embodiment follows the steps of FIG. 11a from 150 through 164. However, instead of proceeding to step 170, this embodiment proceeds to step 200 of FIG. 12a if the answer in step 164 is in the negative.

Steps 200 through 206 and 210 through 216 are similar to steps 170 through 176 and 180 through 186, respectively, and are not further discussed herein. At step 208 and 218, however, any unmatched device NVs and/or CPs are stored in a suitable memory, such as read/write memory provided with the network management tool, as unmatched device NVs and/or CPs respectively.

At step 220, any device NVs that were stored at step 208 as unmatched are identified. If there are no unmatched device NVs that have not been displayed at step 206, then there are no further NVs to resolve and the system proceeds to step 222 and displays any remaining undisplayed node NVs stored at step 150 as removed NVs. The system then proceeds to step 234.

If there is an unmatched and undisplayed device NV at step 220, then at step 224 the system checks for any node NVs stored at step 150 that have not been displayed at step 206, step 216 or step 228. If there is an undisplayed node NV, then at step 226 the system attempts to resolve the undisplayed node NV with any unmatched device NVs.

Those of skill in the relevant art will understand that the resolution process may include a variety of different techniques. By way of example, but not of limitation, the fields may be assigned a value and any matching field is scored according to its value, with "resolution" being the highest score achieved. Additionally and/or alternatively, the definition of "resolution" may include a threshold score. Moreover, a variety of approaches may be used in place of the process discussed herein. By way of example, but not of limitation, CPs may be resolved first and NVs resolved later in the process. Furthermore, it may be desired to allow more than one potential resolution/match for a given NV or CP. These variations and others are considered to be within the scope of the present invention.

If the undisplayed node NV is resolved to match an unmatched device NV, then at step 226 the system treats the two NVs as a potential match, and the undisplayed node NV is displayed along with the corresponding device NV at step 228. The system then proceeds to step 220 to check for any additional unmatched undisplayed device NVs. If the undisplayed node NV cannot be resolved, then at step 230 the undisplayed node NV is displayed as removed. It is "removed" in the sense that even when the logical connections are re-established for the node, because no "match" has been found, no logical connection for this NV will be made. Thus, the NV will no longer be passed to or from the node.

In an alternative embodiment, the process is modified to allow more than one unmatched device NV to be displayed as a potential match. If more than one device NV is proposed, the system may indicate a ranking of the proposed resolutions.

Figure 12B:
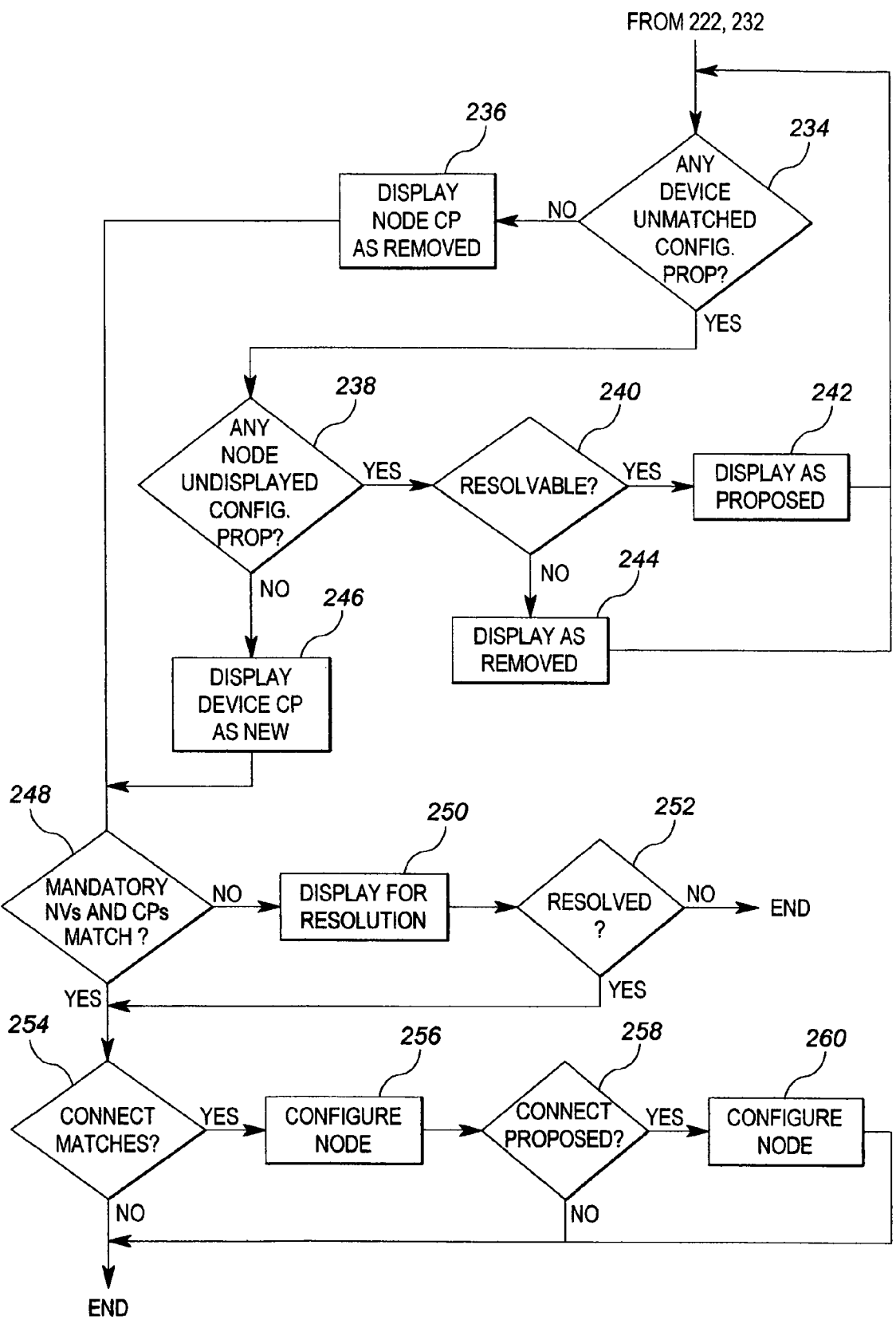

Returning to FIG. 12*a*, if at step 224 there are no remaining undisplayed node NVs, then at step 232, the remaining unmatched undisplayed device NV(s) is/are displayed as new. It is "new" because the node did not previously have a logical connection associated with the NV. Thus, it is a newly available functionality, but not a newly configured functionality. It cannot be configured until a match is defined and a logical connection is made. The system then proceeds to step 234, shown in FIG. 12*b*.

At step 234, any device CPs that were stored at step 218 as unmatched are identified. If there are no unmatched device CPs that have not been displayed at step 216, then there are no further CPs to resolve and the system proceeds to step 236 and displays any remaining undisplayed node CP stored at step 150 as a removed CP. It is "removed" in the sense that the new device does not use the CP. Thus, the CP will no longer be passed to the node. The system then proceeds to step 248.

If there is an unmatched and undisplayed device CP at step 234, then at step 238 the system checks for any node CPs stored at step 150 that have not been displayed at step 216, step 242 or step 244. If there is an undisplayed node CP, then at step 240 the system attempts to resolve the undisplayed node CP with any unmatched and undisplayed device CP.

Those of skill in the art will understand that the resolution process may include a variety of different techniques as discussed above with respect to NVs, all of which are considered within the scope of the present invention. By way of additional example, but not of limitation, the process may compare the nodal data and the device data for changes in units or type. Accordingly, if a node data is in degrees Fahrenheit and a device data is in degrees Centigrade, the resolution algorithm may propose a unit correction to be applied to the device. Of course, this type of correction could be designed to be performed automatically upon detection.

If the undisplayed node CP is resolved to match an unmatched and undisplayed device CP, then at step 242 the undisplayed node CP is displayed along with the best potential unmatched and undisplayed device CP. The system then proceeds to step 234 to check for any additional unmatched and undisplayed device CPs. If the undisplayed node CP cannot be resolved, then at step 244 the undisplayed node CP is displayed as removed.

In an alternative embodiment, the process is modified to allow more than one unmatched device CP to be displayed as a potential match. If more than one device CP is proposed, the system may indicate a ranking of the proposed resolutions.

Returning to FIG. 12*b*, if at step 238 there are no remaining undisplayed node CPs, then at step 246, the remaining unmatched undisplayed device CP(s) is/are displayed as new. It is "new" because the node did not previously use the CP. Of course, it cannot be used by the new device until a match is defined. The system then proceeds to step 248.

At step 248 the network management tool checks all of the unmatched device NVs and CPs for any mandatory NVs and/or CPS that have not been matched. In this embodiment, even proposed matches result in a "No". This is to ensure that the operator carefully evaluates the proposed match. If any mandatory NVs or CPs are not matched, then at step 250 the unmatched mandatory NVs and/or CPs are identified to the operator for resolution. If the operator cannot or chooses not to resolve the mandatory NVs and/or CPs at step 252, then the process ends. If the operator resolves the unmatched mandatory NVs and/or CPs at step 252, then the network management tool continues to step 254.

At step 254, the installer chooses whether or not to accept the matched CPs and NVs, or a subset of the presented matches. If they are not accepted, then the process ends. If they are accepted, then at step 256 the network management tool configures the node by updating the network management database and writing the network image to the new device for the matched NVs and CPs. At step 258, the installer chooses whether or not to accept the proposed resolutions for CPs and NVs. If they are not accepted, then the process ends. If they are accepted, then at step 260 the network management tool configures the node by updating the network management database and updating the network image of the new device with the proposed NVs and CPs. The process then ends.

Those of skill in the art will that appreciate that design choices may result in any of a number of alternative processes. By way of example, but not of limitation, a designer may choose to have the entire process proceed automatically without input from the installer after step 150. Alternatively, each logical connection and CP, matched or proposed, may be individually presented for acceptance. These alternatives and others are within the scope of the present invention.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

We claim:

1. A computerized method of configuring a distributed network after replacing a node comprising:

storing a plurality of network variables for a first device associated with a first node, wherein each of the network variables defines a respective input or output of the first device and a type of data passed via the corresponding input or output, each type of data being representative of an operating parameter of a building control system, wherein the step of storing further comprises storing a configuration table associated with the first node, an address table associated with the first node and a domain table associated with the first node;

obtaining a plurality of network variables for a second device for the first node, each of the network variables for the second device defining a respective input or output of the second device and a type of data passed via the corresponding input or output;

comparing the stored plurality of network variables to the obtained plurality of network variables;

identifying a network variable from the stored plurality of network variables that is not defined in the obtained plurality of network variables;

identifying an entry in a configuration table of a second node that corresponds to the identified network variable, the configuration table listing network variables passed to or from the second node;

deleting the entry in the configuration table of the second node for the identified network variable;

modifying the stored configuration table of the first node by deleting an entry in the stored configuration table for the identified network variable;

modifying the stored address table of the first node by deleting an entry in the stored address table associated with the identified network variable; and writing the modified configuration table, the modified address table and the stored domain table to a replacement device.

2. The method of claim 1, wherein:

the step of storing comprises the step of storing at least one configuration network variable associated with the node;

the step of identifying a network variable comprises identifying at least one configuration network variable from the stored plurality of network variables that does not match a network variable from the obtained plurality of network variables;

the step of identifying an entry comprises identifying an entry in the configuration table of the second node for the identified at least one configuration network variable; and the step of deleting comprises deleting the entry in the configuration table of the second node for the identified at least one configuration network variable.

3. The method of claim 1, further comprising:

updating a network management database to reflect the deletion of the entry in the configuration table of the second node for the identified network variable.

4. The method of claim 1, wherein the step of obtaining comprises the step of:

obtaining at least some of the plurality of network variables associated with the replacement device through the network.

5. The method of claim 4, further comprising the step of:

providing a plurality of heating, ventilation and air conditioning system devices, the devices operably connected and controllable by the network, each of the plurality of heating, ventilation and air conditioning system devices represented as a node on the network, and wherein the step of obtaining a plurality of network variables comprises the step of:

obtaining at least some of the plurality of network variables associated with a heating, ventilation and air conditioning device.

6. The method of claim 4, further comprising the step of:

providing a plurality of (i) building automation devices, (ii) home automation devices, (iii) industrial automation devices, (iv) transportation automation devices, or (v) utility automation devices, the devices operably connected and controllable by the network, each of the plurality of (i) building automation devices, (ii) home automation devices, (iii) industrial automation devices, (iv) transportation automation devices, or (v) utility automation devices represented as a node on the network, and wherein the step of obtaining a plurality of network variables comprises the step of:

obtaining at least some of the plurality of network variables associated with a (i) building automation device, (ii) home automation device, (iii) industrial automation device, (iv) transportation automation device, or (v) utility automation device.

7. The method of claim 4, further comprising:

identifying a stored network variable and an obtained network variable that match; and configuring a logical connection between the matched network variables.

8. The method of claim 1, further comprising the steps of:

displaying a result of the comparison;

receiving an acceptance input; and configuring a logical connection after the result has been accepted.

9. The method of claim 8, wherein the step of displaying comprises the step of;

displaying the network variable from the stored plurality of network variables that was identified as not matching a network variable from the obtained plurality of network variables.

10. The method of claim 9, further comprising the steps of:

performing a resolution analyses for the network variable from the stored plurality of network variables that was identified as not matching a network variable from the obtained plurality of network variables; and displaying the results of the resolution analyses.

11. A tool for use with an automatically controlled distributed processing system employing network variables, wherein a network variable defines an input or output for a device in the network and a type of data passed via the input or output, each type of data being representative of an operating parameter of a building control system, the tool comprising;

a storage media device storing instructions to:

store a configuration table associated with the first device and an address table associated with the first device;

store at least one entry from the address table of the first device in the network;

store an entry from the configuration table of the first device that corresponds to the at least one stored address table entry and identifies a node network variable of a second device in the network, the node network variable defining an input or output of the second device and a type of data passed via the corresponding input or output;

identify device network variables of a third device that replaces the second device and is not bound to the network, each device network variable defining an input or output of the third device and a type of data passed via the corresponding input or output;

compare the node network variable of the second device with the identified device network variables of the third device;

identify the node network variable of the second device as unmatched if the node network variable does not match any of the identified device network variables of the third device;

identify a node corresponding to the at least one entry in the address table of the first device if the node network variable is identified as unmatched; and store a configuration table associated with the identified node and an address table associated with the identified node;

delete an entry in the address table and an entry in the configuration table of the identified node that correspond to the unmatched node network variable: and after performing the deleting instruction step, writing the configuration table and the address table of the identified node to the third device.

12. The tool of claim 11, wherein the tool is operable to read at least some of the network variables of the unbound third device from an external interface file.

13. The tool of claim 12, wherein the tool is operable to provide a result of the comparison for display.

14. The tool of claim 11, wherein the storage media further stores instructions to:

identify the node network variable as matched if the node network variable matches at least one of the identified device network variables; and write the at least one stored entry from the address table of the first device and the stored entry from the configuration table of the first device that corresponds to the at least one stored address table entry to the unbound third device if the node network variable is identified as matched.

15. The tool of claim 11, wherein the node network variable and the device network variables comprise formatted network variables comprising a plurality of data fields.

16. The tool of claim 15, wherein the tool is further programmed to:

accept from a user a first set of network variable data fields, such that when the first set of data fields in a node network variable is the same as the first set of data fields in a device network variable, the tool treats the node network variable as a match with the device network variable.

17. The tool of claim 11, wherein the tool is further programmed to:

store all of the entries from the address table of the first device in the network;

store each of the entries from the configuration table of the first device that correspond to each of the stored address table entries and identify a node network variable;

compare each of the node network variables with the identified device network variables;

identify each of the device network variables as matched if the device network variable matches any of the node network variables;

identify a device network variable as a mandatory device network variable;

determine if the mandatory device network variable is not matched; and notify a user if the mandatory device network variable is not matched.

18. A computerized method of configuring a distributed heating, ventilation and cooling network comprising:

storing a network variable of a first device associated with a first bound node, the network variable defining an input or output of the first device and a type of data passed via the input or output, each type of data being representative of an operating parameter of a building control system;

determining that the stored network variable is not defined as a network variable for a replacement device for the first bound node;

determining if a one-to-one relationship is defined between network variables for the first bound node and network variables for a second node in the network; and deleting an entry in the address table of the second node in the network associated with the stored network variable if a one-to-one relationship is defined.

19. The method of claim 18, further comprising:

determining if the stored network variable is sent to a receiving group by a sending node, wherein the first bound node is a member of the receiving group;

determining if any nodes other than the first bound node are configured to receive the stored network variable; and deleting an entry in the address table of the sending node if no nodes other than the first bound node are configured to receive the stored network variable.

20. The method of claim 18, further comprising:

determining if the stored network variable is sent to a first receiving group of nodes by the first bound node;

determining if a second node in the network is configured to send the stored network variable to the first receiving group of nodes; and deleting an entry in the address table of each node in the first receiving group if no nodes other than the first bound node are configured to send the stored network variable.

21. The method of claim 20, further comprising:

determining if the stored network variable is sent to a second receiving group by a sending node, wherein the first bound node is a member of the second receiving group;

determining if any nodes in the second receiving group other than the first bound node are configured to receive the stored network variable; and deleting an entry in the address table of the sending node if no nodes in the second receiving group other than the first bound node are configured to receive the stored network variable.

* * * * *